(12) United States Patent
Freeman et al.

(10) Patent No.: US 10,630,874 B2
(45) Date of Patent: Apr. 21, 2020

(54) WASTEWATER MONITORING SYSTEM AND METHOD

(71) Applicant: I&Eye Enterprises, LLC, Westwood, KS (US)

(72) Inventors: Brandon Casey Freeman, Springfield, MO (US); Brian Dennis Beatty, Elk City, OK (US)

(73) Assignee: I&EYE Enterprises, LLC, Westwood, KS (US)

( * ) Notice: Subject to any disclaimer, the term of this patent is extended or adjusted under 35 U.S.C. 154(b) by 0 days.

(21) Appl. No.: 16/205,482

(22) Filed: Nov. 30, 2018

(65) Prior Publication Data

US 2019/0104240 A1 Apr. 4, 2019

Related U.S. Application Data

(60) Division of application No. 15/698,185, filed on Sep. 7, 2017, which is a continuation-in-part of application
(Continued)

(51) Int. Cl.
| | |
|---|---|
| *H04N 5/225* | (2006.01) |
| *H04N 5/232* | (2006.01) |
| *G03B 31/00* | (2006.01) |
| *G03B 17/08* | (2006.01) |
| *G03B 37/00* | (2006.01) |

(52) U.S. Cl.
CPC ........... *H04N 5/2254* (2013.01); *G03B 17/08* (2013.01); *G03B 31/00* (2013.01); *G03B 37/005* (2013.01); *H04N 5/2252* (2013.01); *H04N 5/23203* (2013.01); *H04N 5/23245* (2013.01);
(Continued)

(58) Field of Classification Search
CPC ......... H04N 5/2254; H04N 2005/2255; H04N 5/23203; G03B 37/005
See application file for complete search history.

(56) References Cited

U.S. PATENT DOCUMENTS

| | | | |
|---|---|---|---|
| 4,567,514 A | 1/1986 | Morgan et al. | |
| 4,974,168 A | 11/1990 | Marx | |

(Continued)

OTHER PUBLICATIONS

Browning; "Spec Ops Series" (webpage screenshot); Jun. 11, 2013; http://web.archive.org/web/20130611160456/http://browningtrailcameras.com/our-products/trail-cameras/spec-ops-series/.

(Continued)

*Primary Examiner* — Ahmed A Berhan
(74) *Attorney, Agent, or Firm* — Martin & Associates, LLC; Derek P. Martin

(57) ABSTRACT

A wastewater monitoring system uses a camera in a fixed location in a wastewater pipe. The camera is coupled to a sensor that measures some characteristic of material in the wastewater pipe. The sensor is programmed with one or more alarms that, when triggered, cause the sensor to wake up the camera and command the camera to take one or more photos. Sensor data, such as current time/date, location, and the characteristics of material in the wastewater pipe, is sent by the sensor to the camera, which overlays one or more photos with visible text information corresponding to the received sensor data. The sensor can wake up the camera and command the camera to turn on the camera's Wi-Fi interface, which allows a wastewater control system in a remote location to communicate directly with the camera.

13 Claims, 17 Drawing Sheets

Related U.S. Application Data

No. 15/595,901, filed on May 15, 2017, now abandoned, which is a division of application No. 14/634,104, filed on Feb. 27, 2015, now Pat. No. 9,756,231.

(52) U.S. Cl.
CPC .. *E03F 2201/20* (2013.01); *G03B 2215/0567* (2013.01); *H04N 2005/2255* (2013.01)

(56) References Cited

U.S. PATENT DOCUMENTS

| | | | |
|---|---|---|---|
| 7,002,620 | B1 | 2/2006 | Rutledge |
| 7,626,508 | B2 * | 12/2009 | Kosuge ............... E03F 7/00 340/612 |
| 7,715,701 | B2 | 5/2010 | Lange |
| 8,054,459 | B2 | 11/2011 | Lindner |
| 8,085,309 | B1 * | 12/2011 | Kelliher ............... G01S 19/19 348/143 |
| 8,087,311 | B2 | 1/2012 | Merlo |
| 8,243,984 | B1 | 8/2012 | Brown et al. |
| 8,381,593 | B2 | 2/2013 | De Lorenzo et al. |
| 2005/0091311 | A1 | 4/2005 | Lund et al. |
| 2006/0290779 | A1 | 12/2006 | Reverte et al. |
| 2007/0106527 | A1 | 5/2007 | McKinney |
| 2008/0210024 | A1 | 9/2008 | Merlo |
| 2009/0105969 | A1 | 4/2009 | Saylor |
| 2011/0148647 | A1 | 6/2011 | Miller, II et al. |
| 2012/0305458 | A1 | 12/2012 | Jensen et al. |
| 2013/0335550 | A1 * | 12/2013 | Rochenski ............ G08B 17/125 348/82 |
| 2014/0324406 | A1 | 10/2014 | Nesbitt et al. |
| 2015/0338315 | A1 | 11/2015 | Manahan et al. |
| 2015/0339407 | A1 | 11/2015 | Gallo et al. |

OTHER PUBLICATIONS

Browning; "Timelapse View Plus" (webpage screenshot); Jun. 22, 2013; http://web.archive.org/web/20140515022034/http://browningtrailcameras.com/our-products/trail-cameras/timelapse-viewer-plus/.

Browning; "Product Instructions" (webpage screenshot); Jan. 10, 2014; http://web.archive.org/web/20140110094943/http://browningtrailcameras.com/customer-service/product-instructions/.

Browning; "Instruction Manual"; PDF Linked from Jan. 10, 2014 web.archieve.org, http://browningtrailcameras.com/wp-content/uploads/2012/10/Spec-Ops-user-manual-med-res.pdf.

Montgomery, M.; Time Lapse Video; Feb. 1, 201 O; https://www.videomaker.com/article/c3/14612-time-lapse-video; pp. 1-9.

Microsoft; "how do I use a circle to identify a player in a sports video made with movie maker"; Sep. 7, 2012; http ://answers.microsoft.com/en-us/windowslive/forum/moviemaker-av/how-do-i-use-a-circle-to-identify-a-player-in-a/54491480-9721-4825-a0a1-9d159703370b; pp. 1-7.

Stackoverflow.com; "how can I quantify difference between two images?"; Oct. 10, 2008; http://stackoverflow.com/questions/189943/how-can-i-quantify-difference-between-two-images?answertab=votes#tab-top.

BriefCam, Rapid Video Review: Benefits and Payoff, printed from http://briefcam.com/lorem-ipsum-dolor-sit-amet-consectetur-adipiscing-elit/ on Jan. 14, 2017.

* cited by examiner

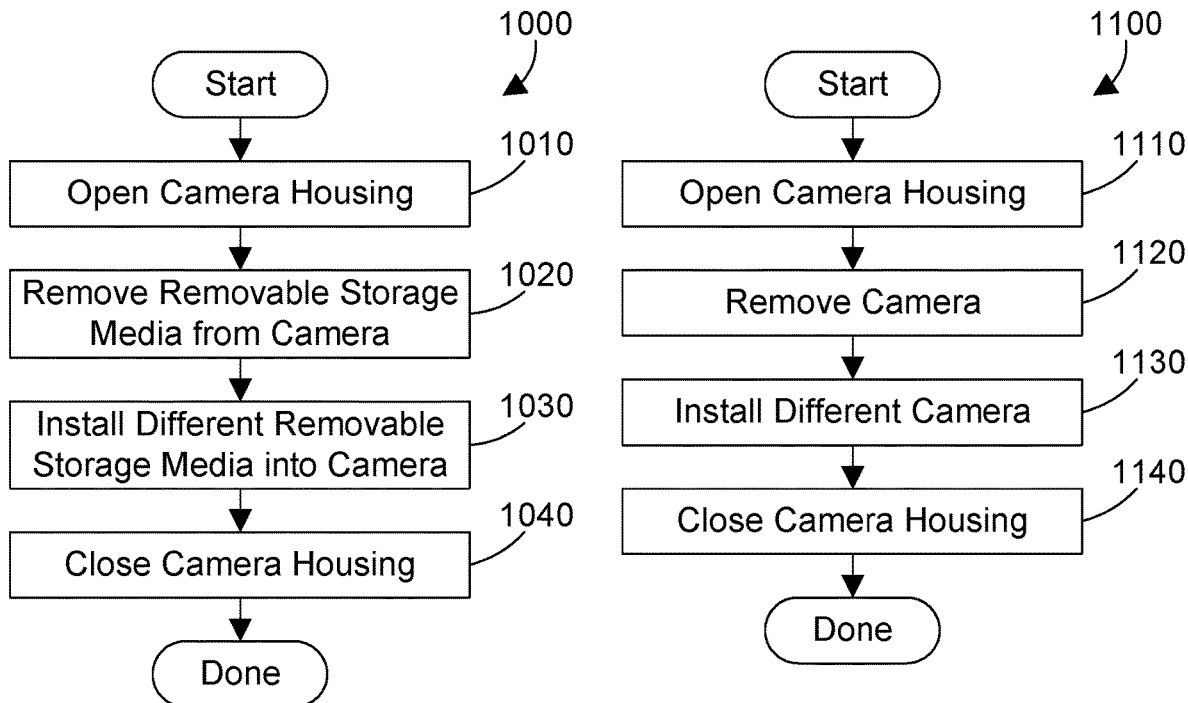
FIG. 10
FIG. 11
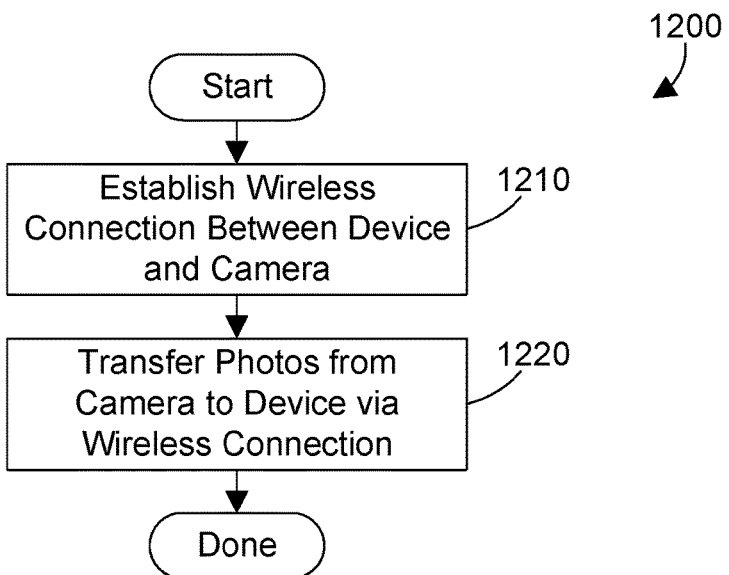
FIG. 12

WASTEWATER MONITORING SYSTEM AND METHOD

BACKGROUND

1. Technical Field

This disclosure generally relates to wastewater monitoring, and more specifically relates to monitoring levels of wastewater in a pipe.

2. Background Art

Many different systems have been developed over the years for monitoring or inspecting the interior of a pipe. For example, U.S. Pat. No. 8,087,311 issued on Jan. 3, 2012 to Stephen A. Merlot discloses a system that includes multiple cameras attached to an interior surface of a pipe that are connected to a data communication network so the data from the camera may be transmitted over the data communication network. A computing device in a remote location receives the data transmitted over the data communication network by the cameras.

The system disclosed in the Merlo patent referenced above requires a constant connection between the cameras and a remote computer system. In addition, the Merlo system is relatively expensive. What is needed is a system and method for monitoring levels in a wastewater pipe that is inexpensive and simple to use.

BRIEF SUMMARY

A wastewater monitoring system uses a camera in a fixed location in a wastewater pipe. The camera is coupled to a sensor that measures some characteristic of material in the wastewater pipe. The sensor is programmed with one or more alarms that, when triggered, cause the sensor to wake up the camera and command the camera to take one or more photos. Sensor data, such as current time/date, location, and the characteristics of material in the wastewater pipe, is sent by the sensor to the camera, which overlays one or more photos with visible text information corresponding to the received sensor data. The sensor can wake up the camera and command the camera to turn on the camera's Wi-Fi interface, which allows a wastewater control system in a remote location to communicate directly with the camera to retrieve camera status, to download photos from the camera, etc.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 10 is a flow diagram of a method for retrieving photographs from a camera that uses removable storage media;

FIG. 11 is a flow diagram of a method for retrieving photographs from a camera by swapping with a different camera;

FIG. 12 is a flow diagram of a method for retrieving photographs from a camera using a device that receives the photographs from the camera via a wireless connection;

DETAILED DESCRIPTION

Figure 1:
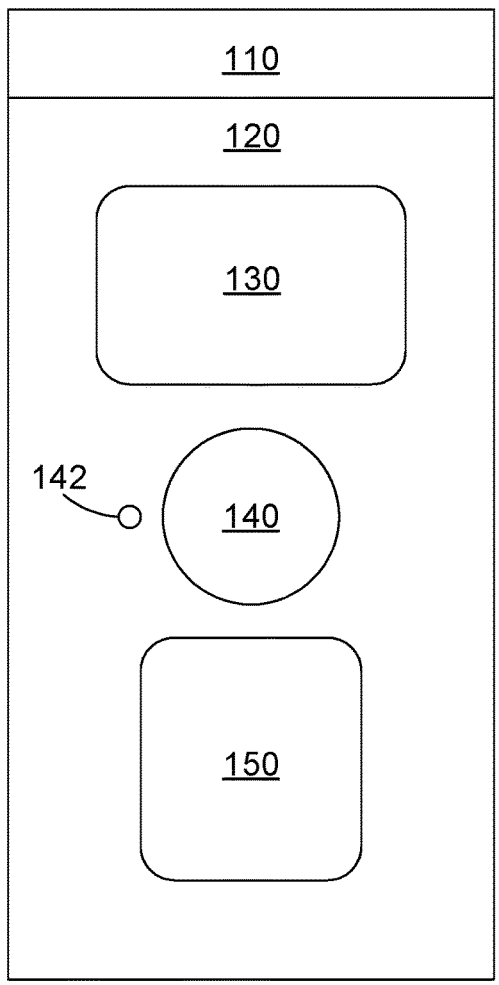
FIG. 1 is front view of a camera that could be used in the wastewater monitoring system disclosed herein.

Most municipalities have separate systems for storm drains and for sewer. Sewage from homes and businesses typically runs in sewage pipes to a sewage treatment plant, which treats the sewage and outputs clean water. Storm water systems typically receive runoff from rain storms and direct the storm water to a holding basin, to a neighboring river or creek, etc. Because storm water is typically runoff from a storm, it typically does not contain sewage or other impurities that require significant treatment. As a result, storm water can often be returned to natural water sources such as creeks or rivers without treatment.

While sewer systems and storm water systems are designed to be separate, sometimes leaks can develop between the two. If storm water leaks into a sewage pipe, the result may be volumes of flow that exceed the design parameters of the sewage pipe. This can cause sewage systems to back up, and can also cause excessive flows to the sewage treatment plant.

Detecting when storm water leaks into a sewage pipe is not a simple or straight-forward process. The degree of the leak can obviously depend on the amount of runoff generated by a storm. Because storms that generate significant runoff are not daily events, a monitoring system must be able to monitor a location of interest for long periods of times, typically spanning several days or weeks. Many of the known systems for monitoring water levels in pipes are sophisticated and expensive. Small municipalities that have issues with storm water leaking into sewage pipes typically do not have the funds to invest in known sophisticated and expensive monitoring systems. For example, U.S. Pat. No. 8,087,311 issued on Jan. 3, 2012 to Stephen A. Merlot (discussed above in the Background Art section) discloses a system that includes multiple cameras attached to an interior surface of a pipe that are connected to a data communication network so the data from the camera may be transmitted over the data communication network. A computing device in a remote location receives the data transmitted over the data communication network by the cameras. Needless to say, installing multiple cameras in a pipe and installing a communication network is an expensive process. What is needed is a simple and inexpensive way to monitor water level in a pipe over days or weeks. The disclosure and claims herein provide a system and method that can detect water level in a pipe without the complexity and expense of known systems.

A wastewater monitoring system uses a camera in a fixed location in a wastewater pipe. The camera is coupled to a sensor that measures some characteristic of material in the wastewater pipe. The sensor is programmed with one or more alarms that, when triggered, cause the sensor to wake up the camera and command the camera to take one or more photos. Sensor data, such as current time/date, location, and the characteristics of material in the wastewater pipe, is sent by the sensor to the camera, which overlays one or more photos with visible text information corresponding to the received sensor data. The sensor can wake up the camera and command the camera to turn on the camera's Wi-Fi interface, which allows a wastewater control system in a remote location to communicate directly with the camera to retrieve camera status, to download photos from the camera, etc.

As used herein, the term "wastewater monitoring system" refers to a system that can detect a level of water or other liquid-based material in a gravity-fed pipe. The term "wastewater" in this context means material in any suitable pipe, including without limitation sewer pipes and storm water pipes. Of course, the monitoring system could be used to monitor level of any material in any gravity-fed pipe, whether water-based or not. The disclosure and claims herein expressly extend to monitoring level of a material in any gravity-fed pipe, whether currently known or developed in the future.

Figure 2:
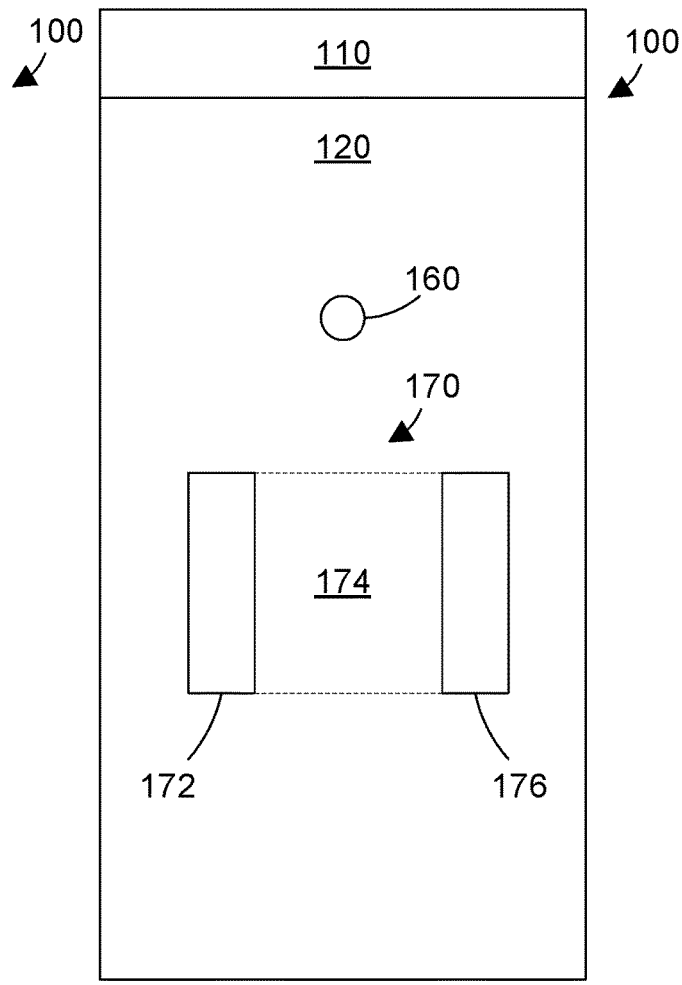
FIG. 2 is a rear view of the camera shown in FIG. 1.

In accordance with the system and method disclosed herein, a single camera can be mounted in a fixed location in or near a wastewater pipe that takes a still photograph of a location of interest at defined intervals. One suitable camera that can be used in the system and method disclosed herein is a digital battery-operated 8 megapixel camera that is marketed by Shenzhen Siyuan Digital Technology Co., Ltd. as a home security camera. Specifications for this camera are available at the web page http://siyuanchina.en.alibaba.com/product/217648263-200501337/ 8mp_HD_Weather_proof_IP66_Invisible_IR_home_ security_guard_camera. html?edm_src=sys&edm_type=fdbk&edm_grp=0&edm_ cta=read_msg&edm_time=realtime&edm_ver=e. This camera is represented as camera 100 in FIGS. 1-4 and 7. FIG. 1 shows a front view of camera 100, which includes a top 110 that covers a battery compartment, a cylindrical body 120, an array of infrared illuminators 130, a lens 140, a laser 142, and a motion sensor 150. Note the motion sensor 150 is typically not used in the wastewater monitoring system disclosed herein. The laser 142 is used to provide a visual indication of where the camera is pointed. The back view of camera 100 shown in FIG. 2 shows a threaded insert 160 that is sized to receive the mounting post on most tripods, and a belt slot defined by two openings 172 and 176 that are interconnected with a passage 174, allowing a strap to be passed through the slot to attach the camera to something using a strap.

Figure 3:
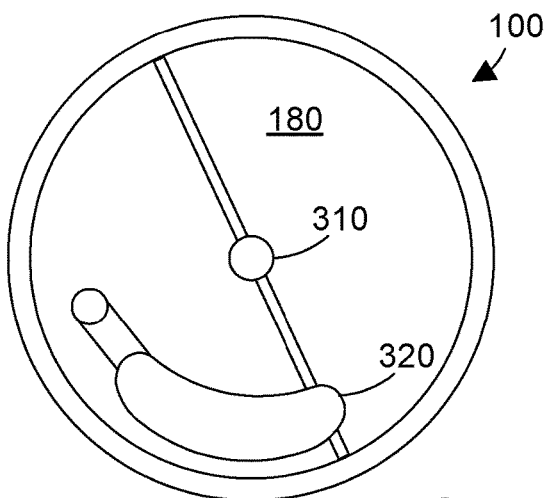
FIG. 3 is a bottom view of the camera shown in FIGS. 1 and 2 with the bottom cover in place.

FIG. 3 shows a bottom view of the camera with the bottom cover 180 in place. The bottom cover 180 includes another threaded insert 310 that is sized to receive the mounting post on most tripods. The bottom cover 180 also includes a rubber cover 320 that provides a sealed cover that can be removed to access the switch 460 and the DC power jack 470 shown in FIG. 4 without removing the bottom cover 180.

Figure 4:
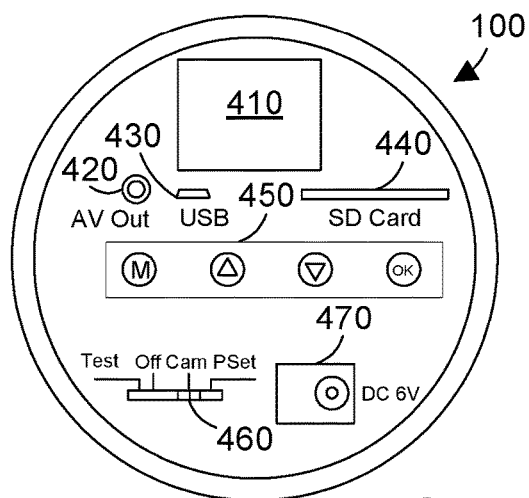
FIG. 4 is a bottom view of the camera shown in FIGS. 1 and 2 with the bottom cover removed.

FIG. 4 shows the bottom view of the camera 100 with the bottom cover 180 in FIG. 3 removed. The camera includes a small display 410, an Audio/Video Out jack 420, a micro USB jack 430, an SD card slot 440, a set of push buttons 450, a switch 460, and a DC power jack 470. The switch 460 and buttons 450 allow programming the camera for a desired mode of operation. Thus, using the display 410, buttons 450 and switch 460, the user could configure the camera to take a still photograph once every five minutes, for example. Once the camera is programmed for the desired function, the bottom cover 180 shown in FIG. 3 can be replaced, and the camera 100 is then ready to be deployed to monitor a location of interest.

Figure 5:
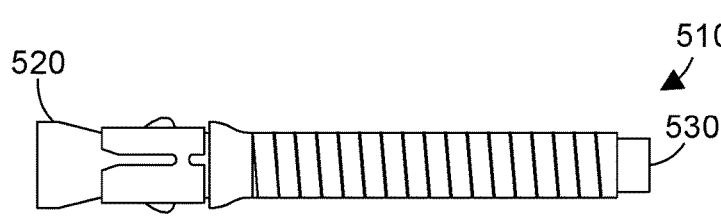
FIG. 5 is a side view of a concrete anchor.
Figure 6:
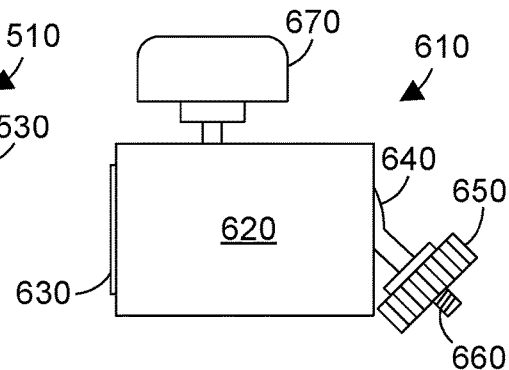
FIG. 6 is a side view of a ball joint.

Most wastewater systems have manholes that are typically made of brick or concrete and pipes that are typically made of concrete, polyvinyl chloride (PVC), clay, and other materials. Manholes are typically covered with manhole covers to provide access to the pipes to people who need to service the system. In the most preferred implementation, the camera 100 in FIGS. 1-4 is deployed to a location near a manhole, and is attached to a side of the concrete manhole or pipe using a concrete anchor 510 shown in FIG. 5. Concrete anchors 510 as shown in FIG. 5 are well-known and are available from a number of different suppliers. FIG. 6 shows a ball joint 610 that can be used to point the camera to a location of interest. The ball joint 610 includes an adjustment knob 670 that, when loose, allows the shaft comprising 640, 650 and 660 to pivot in relation to the position of the body 620. Once the adjustment knob 670 is tightened, the shaft comprising 640, 650 and 660 is locked into position. Ball joint 610 also includes a metal internally threaded insert 630. Ball joint 610 is one suitable example of a direction orientation mechanism that can be used to fixedly mount the camera to point to the location of interest. Many other direction orientation mechanisms could be used within the scope of the disclosure and claims herein. One suitable example for ball joint 610 is the MH 1004 Mini Ball Head manufactured by Giottos.

Figure 7:
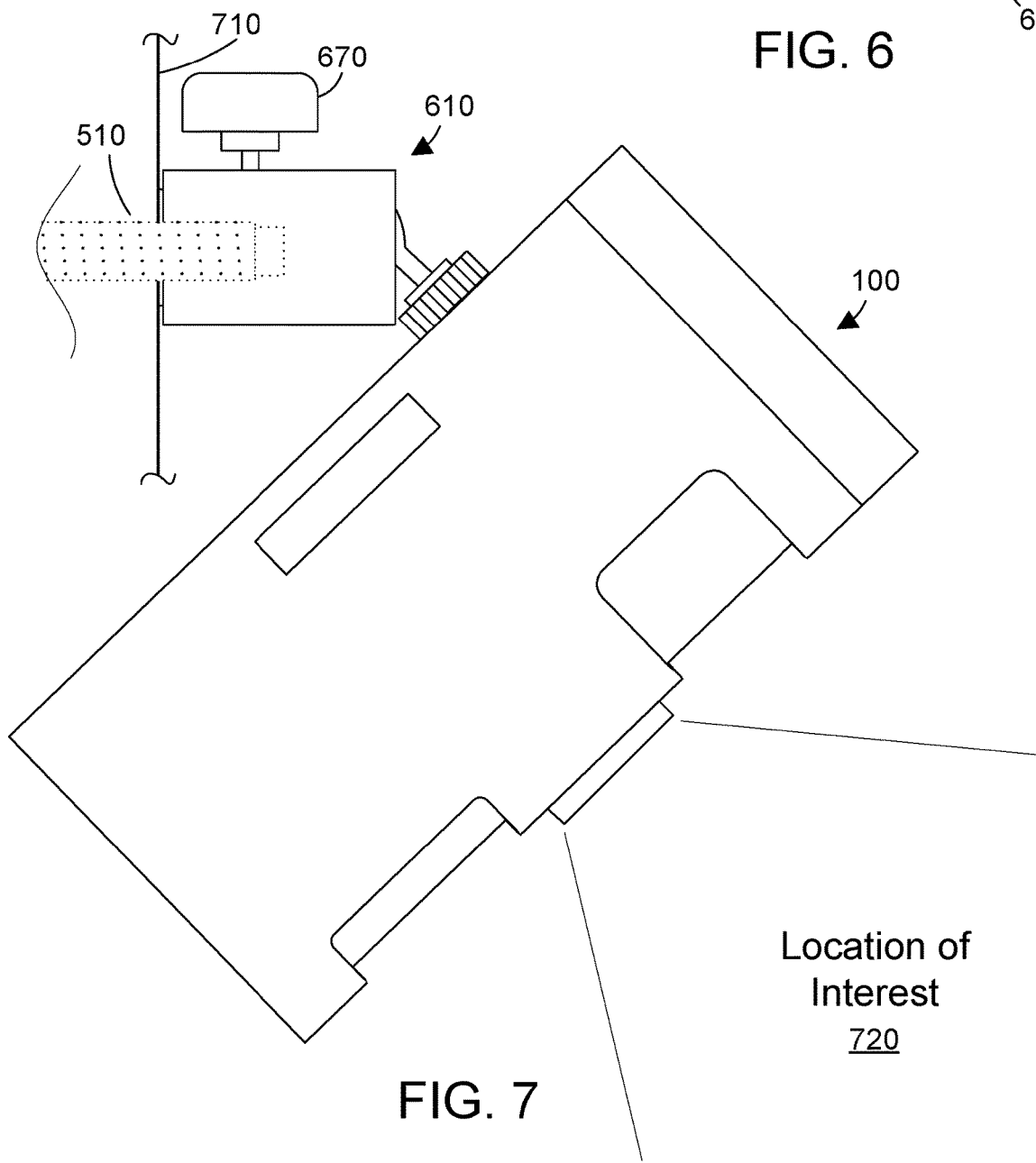
FIG. 7 is a side view showing how the camera in FIGS. 1-4 can be mounted in a fixed location in a wastewater pipe using the concrete anchor in FIG. 5 and the ball joint in FIG. 6.

Referring to FIG. 7, to mount the camera 100 in a fixed location so the camera can take photographs of a location of interest, a manhole cover is typically removed, a hole of the appropriate size is drilled in a concrete wall 710 with a cordless drill using a masonry bit, and the anchor end 520 of the concrete anchor 510 is then pounded into the hole, as partially shown at 510 in FIG. 5. The anchor is then secured in place, typically by turning a nut onto the threaded end 530 and turning the nut with a wrench until the anchor end 520 is securely anchored in the hole. Once the anchor 510 is securely anchored in the hole, as partially shown at 510 in FIG. 7, the threaded insert 630 of the ball joint 610 can be threaded onto the threaded end 530 of the anchor, as shown in FIG. 7. Once the ball joint 610 is secured in place to the anchor 510, the threaded insert 160 on the back of the camera 100 (shown in FIG. 2) is screwed onto the threaded post 660 of the ball joint 610, and the thumb wheel 650 can be turned to tighten the connection between the ball joint 610 and the camera 100. Once the camera is securely mounted to the threaded post 660, the knob 670 is loosened to allow the shaft of the ball joint to freely rotate, which allows the position of the camera 100 to be changed until the lends of the camera 100 is pointed to a location of interest 720. The process of pointing the camera 100 to the location of interest 720 is greatly simplified using laser 142 shown in FIG. 1. The laser 142 provides a colored dot of light that can be aimed at any suitable target in the location of interest to assure the camera is pointed at the location of interest. Once the camera 100 is pointed to the location of interest 720, the knob 670 is tightened to lock the camera in a fixed position with the lens pointed towards the location of interest 720. A nice feature of using the laser 142 is the ability to orient the camera in the same orientation time after time. A simple example will illustrate. Let's assume a person initially installs the camera as shown in FIG. 7, and uses the laser to point to a defined feature or point in the location of interest. The person could even mark the feature or point with a colored marker. The camera could be removed, then a year later the camera could be re-installed with the laser pointing to the same feature or point in the location of interest. The laser 142 thus provides precision in aiming the camera. Once the camera is re-installed and the laser 142 is pointed to the same point feature or point, the new photographs taken by the camera could then be compared with the photographs taken a year ago because the camera is pointing to the same feature or point in the location of interest.

While the installation shown in FIG. 7 shows installing the camera in a fixed location on a vertical surface near a manhole cover or pipe, the camera could be mounted on any suitable surface in any suitable orientation. For example, the camera could be mounted to the bottom surface of a manhole cover pointing straight down. In the alternative, the camera could be mounted to the bottom surface of a manhole cover pointing to an off-angle with respect to straight down. The manhole cover could then be rotated until the camera is pointed to the location of interest. One way to do this is to establish a wireless connection between the camera and a portable device such as a phone so what the camera is pointed to is visible on the portable device using an app on the portable device. When the camera includes a Wi-Fi interface, another way to do this is to establish a connection with the camera via its Wi-Fi interface, with the camera streaming video of what it currently sees so a user can determine whether the camera is pointed to the correct location of interest. Another way of mounting the camera uses a pressure bar, similar to a shower curtain rod, that pushes out between two opposing surfaces so the pressure bar can be mounted between two walls beneath the manhole cover. The camera could then be mounted to the pressure bar using any suitable connector. A pressure bar allows mounting the camera in a way that does no permanent damage to the manhole area. In addition, a pressure bar can be installed from outside the manhole without having to enter the confined space of the manhole. These and other variations for mounting the camera are within the scope of the disclosure and claims herein.

Figure 8:
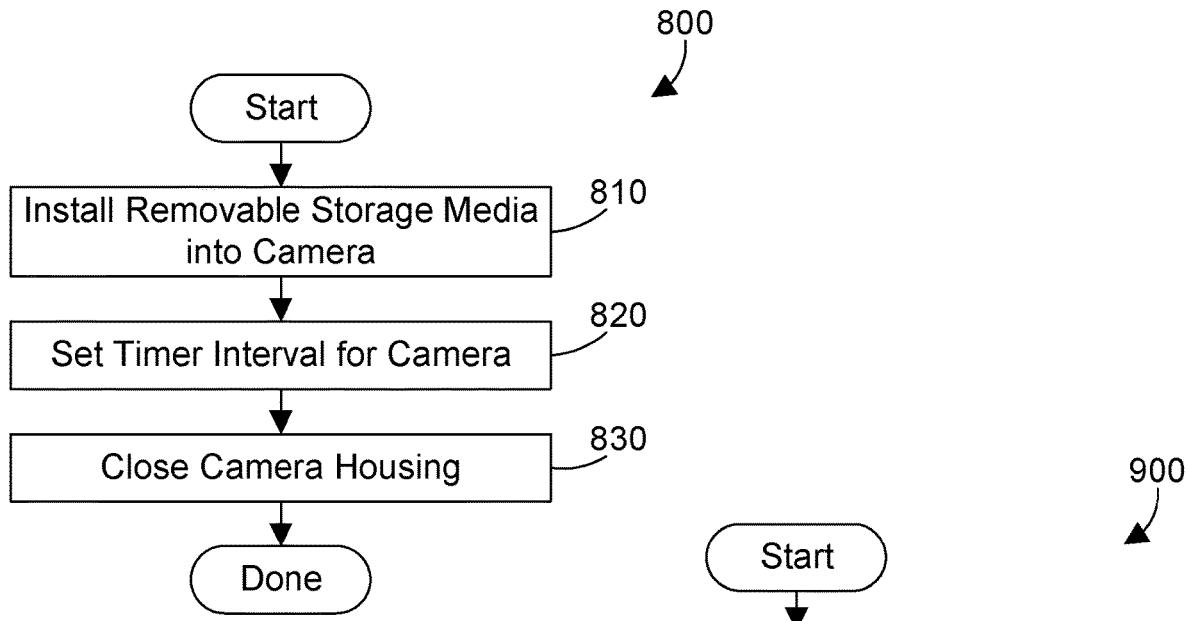
FIG. 8 is a flow diagram of a method for preparing a camera to monitor levels of wastewater in a wastewater pipe.

Referring to FIG. 8, a method 800 includes the steps for preparing a camera for use in the wastewater monitoring system. First, removable storage media is installed into the camera (step 810). The timer interval for the camera is set (step 820). The camera housing is then closed (step 830). The camera is ready to start taking photographs of the location of interest once the camera is mounted in the fixed location. For the specific example of the camera 100 in FIGS. 1-4, step 810 could include installing an SD card into the SD card slot 440 shown in FIG. 4. Step 820 would include the user setting the mode of the camera using the switch 460 and the buttons 450. Setting the camera to take a photograph every five minutes is one example of a suitable interval. The camera housing is closed in step 830 by installing the bottom cover 180 shown in FIG. 3.

Figure 9:
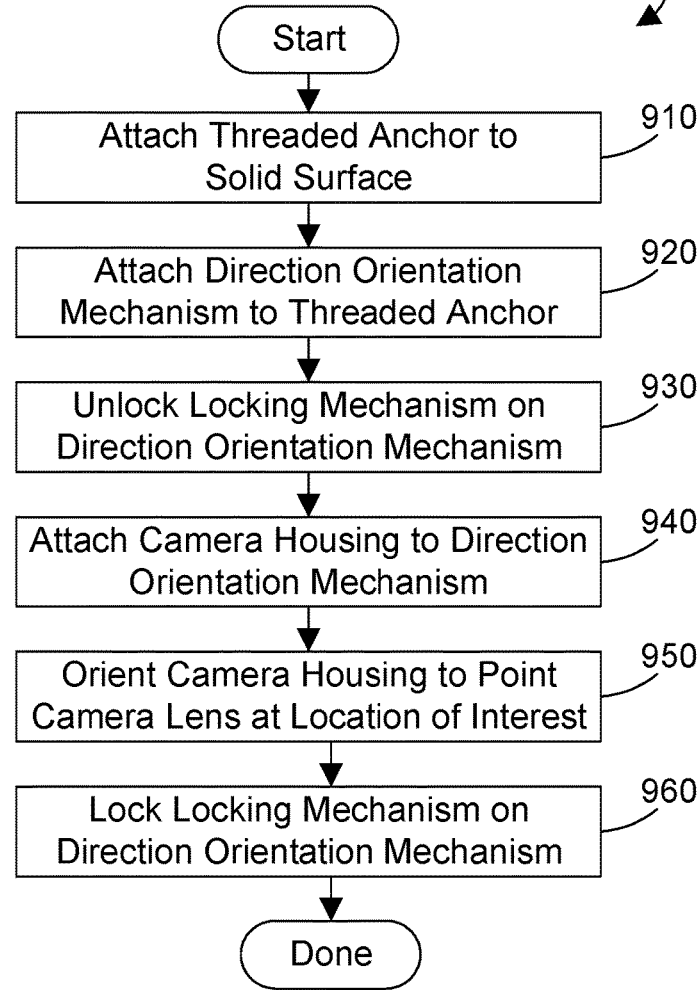
FIG. 9 is flow diagram of a method for installing a camera to monitor levels of wastewater in a wastewater pipe.

The steps for installing a camera in a fixed location are shown in method 900 in FIG. 9. The threaded anchor is attached to a solid surface (step 910). The direction orientation mechanism is attached to the threaded anchor (step 920). The locking mechanism on the direction orientation mechanism is unlocked (step 930), which allows a second part of the direction orientation mechanism to change position with respect to a first part of the direction orientation mechanism that is attached to the anchor. The camera housing is then attached to the direction orientation mechanism (step 940). The camera housing is then oriented to point the camera lens at a location of interest (step 950). The locking mechanism on the direction orientation mechanism is then locked (step 960), which locks the camera in a fixed location that points the camera lens at the location of interest. Method 900 is then done. The result if performing methods 800 and 900 shown in FIGS. 8 and 9, respectively, is illustrated in a camera 100 as shown in FIG. 7 that is mounted in a fixed position with respect to the location of interest 720.

Once the camera has been in place and taking photographs for a sufficient period of time, which can include days or weeks, the photographs need to be analyzed. To avoid the expense of having the camera communicate with some hard-wired or wireless communication system, the photographs may be retrieved from the camera by a person going to the location where the camera is mounted and retrieving the photographs. This can be done in different ways. When the camera includes removable media, such as a SD card, a thumb drive, or other removable media, method 1000 in FIG. 10 may be used. The person retrieving the photos opens the camera housing (step 1010). The removable storage media upon which the photos have been stored is removed from the camera (step 1020). A different removable storage media can be optionally installed into the camera (step 1030). The camera housing is then closed (step 1040). The person who removed the removable storage media can then transport the removable storage media with all its stored photos to a different location for analysis.

Instead of using a camera that has removable storage media, a camera could be used that stores the photographs in its internal memory. In this case, the camera could be removed and replaced with a similar camera so the camera's stored photographs can be analyzed. Referring to FIG. 11, method 1100 begins by the user opening the camera housing (step 1110). The user removes the camera from the housing (step 1120), installs a different camera into the housing (step 1130), and closes the camera housing (step 1140). The camera that has the stored images can then be transported to a different location for analysis while the new camera continues to take photographs of the location of interest.

In yet another implementation, the camera can include a wireless interface, such as a Bluetooth interface or a Wi-Fi interface, that allows the person to download the photographs from the camera to some external device. The photographs can be downloaded to a remote computer system, or can be downloaded to a portable device, such as a laptop computer, tablet computer, or smart phone that is in proximity to the camera. Referring to FIG. 12, method 1200 begins by establishing a wireless connection between a device that will receive the photos and the camera (step 1210). The photos are then transferred from the camera to the device via the wireless connection (step 1220). When the photos are transferred to a portable device, if the portable device has sufficient computing capacity and the proper software, the analysis of the photographs can be done directly by the portable device without transporting the portable device to a different location and without transmitting the photographs to a different location. In addition, in many circumstances the wireless interface may be available without removing the manhole cover. A simple example will illustrate. Let's assume the camera is installed in a manhole in the middle of a busy intersection. Assuming a portable device can access the wireless interface of the camera without removing the manhole cover, a person could stand on a street corner near the intersection and access the photographs in the camera using a portable device without the need of stopping traffic or removing the manhole cover. In the alternative, if the camera is able to connect to a suitable wireless connection such as a Wi-Fi network, the photos could be downloaded via the Wi-Fi connection to a remote device, such as a computer system.

Figure 13:
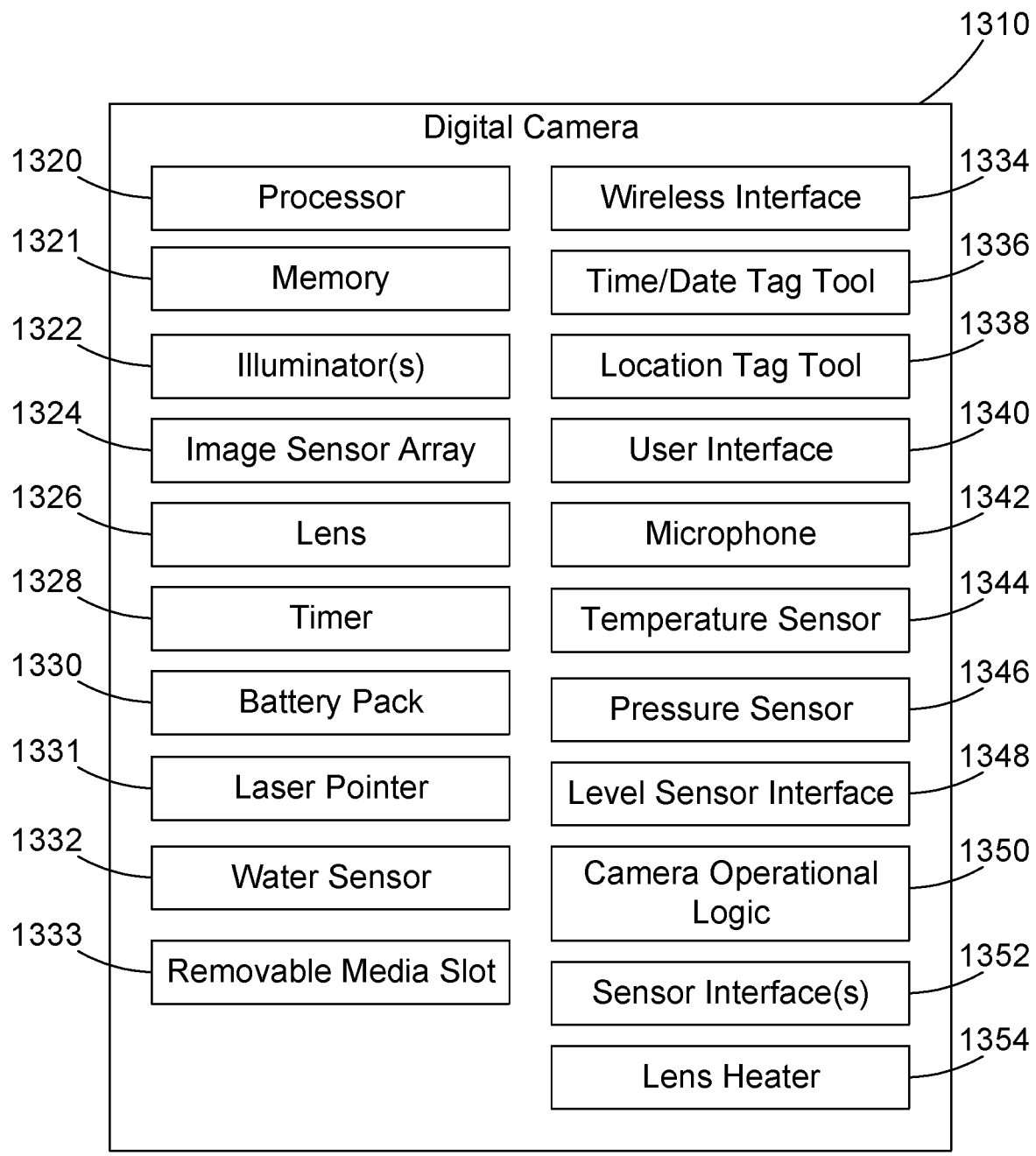
FIG. 13 is a block diagram of one suitable implementation for a digital camera that could be used in the wastewater monitoring system disclosed and claimed herein.

Referring to FIG. 13, a suitable digital camera 1310 could be used in the wastewater monitoring system disclosed and claimed herein. The digital camera 1310 includes a processor 1320; an internal memory 1321; one or more illuminators 1322; an image sensor array 1324; a lens 1326; a timer 1328; a battery pack 1330; a laser pointer 1331; a water sensor 1332, a removable media slot 1333; a wireless interface 1334; a time/date tag tool 1336; a location tag tool 1338; a user interface 1340; a microphone 1342; a temperature sensor 1344; a pressure sensor 1346; a level sensor interface 1348; camera operational logic 1350; one or more sensor interfaces 1352 that provide communication with one or more external sensors; and a lens heater 1354. The processor 1320 preferably executes the camera operational logic 1350 that resides in the memory 1321 to provide the control and processing function for taking and storing digital photographs, and for performing other camera functions disclosed herein. The illuminator(s) 1322 are preferably one or more light sources that can serve to illuminate a location of interest. Examples of suitable light sources include one or more light-emitting diodes (LEDs), which may include infrared LEDs, white LEDs, color LEDs, etc. When the illuminator(s) 1322 are white or color LEDs, the camera 1310 is preferably a color camera with a lens that filters infrared light. When the illuminator(s) 1322 are infrared LEDs, the camera could be a color camera, or is more preferably a black-and-white camera, with a lens that does not filter infrared light. The illuminator(s) 1322 are important in wastewater monitoring because wastewater pipes typically do not have sufficient light for a photograph without using an infrared illuminator. While illuminator(s) 1322 are shown in the figures and discussed herein, one skilled in the art will appreciate that any type of illuminator could also be used, including any suitable source of light. The image sensor array 1324 is an array of photo-sensitive devices, such as charge-coupled devices (CCDs) that allow taking a digital photograph, as is known in the art. The lens 1326 could be a fixed-focus lens, or could be an adjustable lens, where the lens directs an image to be taken as a photograph onto the image sensor array 1324. The lens 1326 could also be removable, allowing different lenses to be installed in camera 1310 depending on the field of view needed for a particular installation. The timer 1328 allows a user to set a time interval so the camera 1310 will take one photograph automatically each defined time period, such as five minutes. The battery pack 1330 can include any suitable direct current power source from any suitable battery chemistry or technology. The battery pack 1330 could be single-use, or could be rechargeable. The battery pack 1330 preferably provides sufficient power for the camera 1310 to function taking photographs for days, weeks or months without interruption.

The laser pointer 1331 provides a visual indication such as a colored dot from a low-power laser that helps to point the camera lens at the location of interest. As discussed above, the laser pointer 1331 provides precision in pointing the camera so the camera can be repeatedly removed and installed to point to the same feature or point in the location of interest. This allows correlating photographs taken across multiple installations over time at the same location. The water sensor 1332 detects when water contacts the camera or the housing of the camera. For a camera similar to the camera shown in FIGS. 1-4 and 7, the water sensor 1332 could include two metal contact points on the case, where the water sensor 1332 detects electrical resistance between the two metal contact points. When water does not bridge the gap between the two metal contact points, the water sensor 1332 detects a very high electrical resistance, which means no water is present. When water bridges the gap between the two metal contact points, the water sensor 1332 detects a significantly lower electrical resistance, which means water is present. In an alternative implementation, the two metal contacts can be capacitive sense contacts that detect changes in capacitance between the two contacts. In some implementations, such as with a housing as shown in FIGS. 25-30, the water sensor would have metal probes on the exterior of the housing connected with wires to circuitry within the camera that would detect whether water is contacting the housing. The water sensor 1332 is especially useful in detecting an overflow condition where water is flooding up and out of the wastewater system through the manhole covers.

The removable media slot 1333 allows removable storage media to be installed into the camera 1310, which will result in photographs being stored on the removable storage media. Examples of removable media slot 1333 include an SD card reader that receives an SD card, and a USB port that receives a thumb drive. All suitable types of removable media and corresponding slots are within the scope of the disclosure and claims herein. The wireless interface 1334 can be used to connect the camera 1310 to a local or remote device for transferring the stored photographs to the device. A Bluetooth interface is one suitable example of a wireless interface 1334 when the photographs are to be transferred to a local device. A Wi-Fi interface is another suitable example of a wireless interface 1334, which is better suited than Bluetooth for sending the photographs to a remote device, such as a remote computer system. The loading of photographs from a camera to an external device via a wireless interface is discussed above with reference to method 1200 in FIG. 12. Note, however, the wireless interface 1334 could also be used to configure the camera operational logic 1350 so the user does not have to move switches or push buttons on the camera 1310 to put the camera 1310 in the desired mode of operation.

The time/date tag tool 1336 tags each photograph taken by the camera with the time and date of the photograph. The tagging of time and date for a photograph is most preferably done electronically by storing metadata that includes the time and date as part of the digital photograph file. In addition, the time and date could also be optionally superimposed on the photograph itself as visible text information so the time and date is visually apparent to a person viewing the photograph. The location tag tool 1338 could optionally tag each photo with the geographic location of the camera when the photograph was taken. The geographic location can be specified in any suitable way, including global positioning system (GPS) coordinates, or using any other way for specifying a geographic location, whether currently known or developed in the future. Note the camera need not include a GPS function to dynamically determine its location because the camera is mounted in a fixed location. Thus, the location of the camera could be specified to the camera at the time the camera is installed, which allows the location tag tool 1338 to tag each photo taken by the digital camera with the specified location. In addition, the date and time can be added to one or more frames in a video stream captured by the camera in addition to being added to still photographs. Because a video stream is simply a sequence of photographs, the term "one or more photos" can include a single photo, multiple photos, or a video that includes multiple photos in time sequence.

The user interface 1340 allows the user to setup the camera 1310 to a desired mode of operation by defining the camera operational logic 1350, such as taking a photograph automatically every five minutes, or functioning as a slave to an external sensor. The user interface 1340 can optionally include a display that allows viewing the image captured by the camera, or viewing a video that shows what the camera sees, which can be very helpful in initially installing the camera. The microphone 1342 can be optionally used to change function of the camera 1310. For example, let's assume the camera 1310 is initially setup to take a photograph every five minutes. Let's further assume the camera monitors the ambient sound level using microphone 1342. When the ambient sound level detected by the microphone 1342 exceeds some specified threshold, which could indicate rushing water in the pipe, the camera function could change to take a photograph every minute instead of every five minutes. Because the camera 1310 is used to monitor level of water in a pipe, and because water makes sounds as it passes through a pipe, a change in the volume level detected by the microphone 1342 on the camera 1310 can indicate a change in the water level in the pipe, and could thus be used to change the function of the camera as desired or to tag one or more photographs according to detected sound levels.

The temperature sensor 1344 detects temperature at or near the location of interest. This is most easily done using a remote temperature sensor. One suitable remote temperature sensor is a laser-type temperature sensor that detects temperature of a surface contacted with a laser. Such laser-type temperature sensors are available in most hardware stores at nominal cost, and could be built into the camera as shown in FIG. 13. Because groundwater that leaks into a sewer system in infiltration or inflow is typically a different temperature than the material flowing in the sewer system, a rapid change in temperature can signal the presence of groundwater in the sewage pipe. In some applications or at some times of the year, the groundwater could be significantly warmer than the sewage in the sewer pipe. In other applications or at other times of the year, the groundwater could be significantly cooler than the sewer in the sewer pipe. When the camera detects via the temperature sensor 1344 a rate of change in temperature that exceeds some defined threshold over some defined time period, the camera could change its function. For example, the camera could be initially programmed to take one photograph every five minutes. But when the camera detects via the temperature sensor 1344 a change in temperature that exceeds the defined threshold over the defined time period, the camera could automatically change to taking one photograph every minute instead of every five minutes. The disclosure and claims herein expressly extend to suitably changing the function of a camera based on some detected temperature change.

The pressure sensor 1346 could be used to detect when the pressure at the camera increases. This could happen, for example, when the system backs up and overflows through the manhole covers. The pressure sensor 1346 allows the camera to detect when the pressure surrounding the camera or housing increases, thereby allowing the camera to alter its function, send an alarm, etc.

Figure 14:
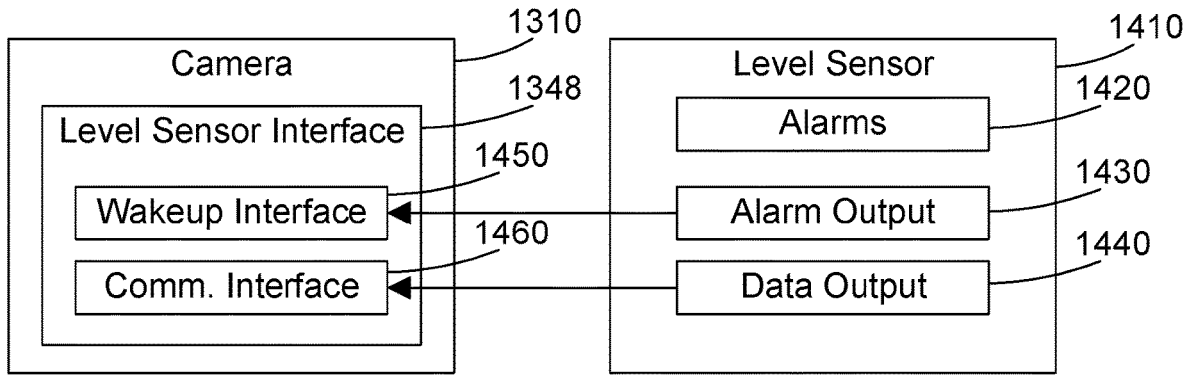
FIG. 14 is a block diagram showing one specific implementation for the level sensor interface shown in FIG. 13 connected to a level sensor.

The level sensor interface 1348 allows the camera to communicate with a suitable level sensor. Details of one specific implementation for the level sensor interface 1348 are shown in FIG. 14. A level sensor 1410 includes one or more alarms 1420 that may be programmed according to levels detected by the level sensor. The level sensor 1410 includes one or more alarm outputs 1430 that are connected to a wakeup interface 1450 in the level sensor interface 1348 in camera 1310. The wakeup interface 1450 can be any suitable implementation, such as a single digital line that is asserted by the alarm output 1430 to the wakeup interface 1450 to wake up the camera 1310, and de-asserted by the alarm output 1430 when the alarm has passed. The level sensor 1410 also includes a data output 1440 that allows communicating on any suitable communication interface, such as communication interface 1460 in camera 1310. In one specific configuration, the connection from the data output 1440 and communication interface 1460 is via a RS-485 serial interface that that supports serial communications on a two-wire serial half-duplex tri-state bus. The tri-state RS-485 bus allow connecting multiple cameras to one level sensor so an alarm in the level sensor can cause multiple cameras to wake up and take one or more pictures or a video. This approach allows multiple cameras to be slaves to a single level sensor, thereby providing different points of view for a location of interest. The level data received by each camera from the level sensor could be overlaid on all the photos as visible text, thereby allowing correlation of the photos from each camera to each other via the overlaid level data.

Eastech Flow Controls developed and sells a level sensor called the iTracker. Eastech Flow Controls has developed a modified iTracker to work with the digital camera disclosed herein. The references below to an iTracker are understood to mean a modified iTracker, as opposed to an off-the-shelf iTracker that is currently available. The modified iTracker is a self-contained level sensor that includes hard-wire connections that may be connected to the level sensor interface 1348 on camera 1310. The iTracker level sensor includes multiple alarm outputs 1430, and a two-wire RS-485 communication interface that communicates the data output 1440 to the communication interface 1460 in the level sensor interface 1348 in camera 1310. The iTracker level sensor further includes a Wi-Fi interface that allows communicating with the iTracker from a remote computer system via network communications over Wi-Fi.

Referring again to FIG. 13, the camera operational logic 1350 is software that resides in the memory 1321 and is executed by the processor 1320 so the camera will perform its desired functions. The camera operational logic 1350 supports communication with a level sensor via the level sensor interface 1348. The camera operational logic 1350 preferably performs method 1500 shown in FIG. 15 and method 2000 in FIG. 20, which are discussed below.

The sensor interface(s) 1352 represent any suitable interface to any suitable sensor or sensors that are external to the camera 1310. The level sensor interface 1348 is one specific example for the sensor interface 1352. The camera 1310 may function using inputs from many different sensors. As discussed in detail above, water sensor 1332, microphone 1342, temperature sensor 1344 and pressure sensor 1346 are examples of sensors that could be incorporated into the camera 1310. The level sensor interface 1348 and sensor interface 1352 provide interfaces to sensors external to the camera 1310. Note that any suitable sensor could be included as part of the camera 1310, as discussed above for the water sensor 1332, microphone 1342, temperature sensor 1344 and pressure sensor 1346. In the alternative, the sensor interface(s) 1352 could include interfaces to an external water sensor, an external microphone, an external temperature sensor, and/or an external pressure sensor. In addition, the sensor interface(s) 1352 could include an interface to any suitable sensor, whether currently known or developed in the future.

Because camera 1310 is used in a wastewater pipe, the humid environment can cause fogging of the lens of the camera due to condensation of water vapor on the lens. Camera 1310 preferably includes a lens heater 1354 that can heat the lens to eliminate any accumulated condensation on the lens. One specific implementation of the lens heater 1354 is placing the illuminator(s) 1322 in proximity to the lens so heat generated by the illuminator(s) 1322 can dissipate any accumulated condensation on the lens. Another implementation of the lens heater is a nichrome wire or other heating strip embedded in the lens or running around the periphery of the lens. By applying power to the nichrome wire, the lens is heated to eliminate any accumulated condensation. Other types of lens heaters are also within the scope of the camera disclosed herein, including heated fans and any other type of heater that could be used to heat the lens.

Note that a suitable digital camera that could be used in the wastewater monitoring system disclosed herein need not include all of the features shown in FIG. 13. A subset of these features could be used, depending on the specific implementation.

One possible mode of operation for the camera 1310 is to set a timer interval for taking photographs as shown in FIG. 8, which results in the camera taking one photograph each time period. It has been found in field testing of wastewater monitoring systems that battery life in the camera becomes a crucial, limiting factor in the system. When the camera is always on, with a timer counting down to taking the next photo, the battery life can affect the usability of the system. Using the iTracker level sensor, an alternative mode of operation for the camera 1310 is possible. In essence, the camera becomes a slave to the iTracker level sensor, only waking up when instructed by the iTracker level sensor. Thus, instead of programming the camera to take a photograph every five minutes, an alarm on the iTracker can be set to go off to wake up the camera every five minutes. This allows the camera to normally be in a deep sleep mode that greatly reduces battery drain. The camera wakes up when instructed by the iTracker, receives level data from the iTracker, takes a photo or video, overlays the level data received from the iTracker as visible text on the photo or video, then goes back into deep sleep mode. Note that when the camera takes a video, the video can include sound from the microphone 1342. Note also a combination of video and still photos can be taken by the camera. For example, at the start of an event indicated by an alarm, the camera could take ten seconds of video, then go into sleep mode, then take a single photograph each time the camera wakes up. These and other variations are within the scope of the disclosure and claims herein.

Figure 15:
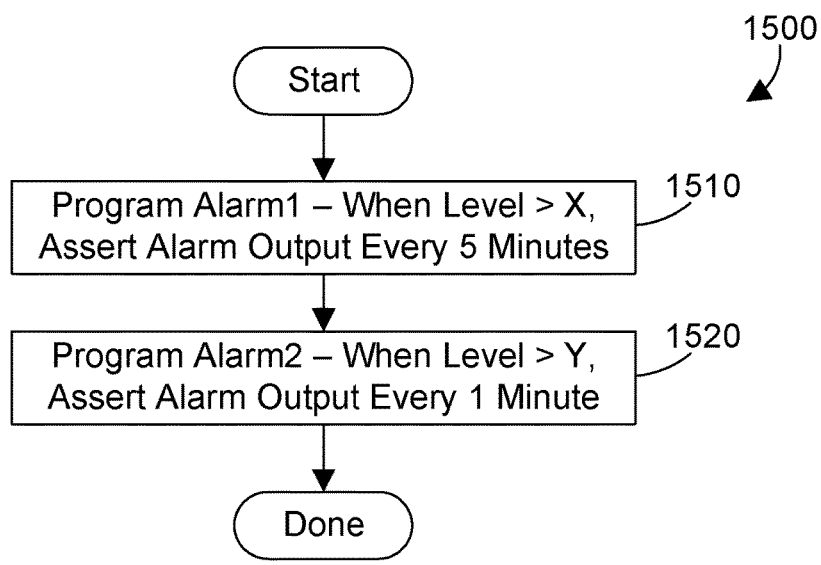
FIG. 15 is a flow diagram of a method for programming two different alarms into the level sensor in FIG. 14.
Figure 16:
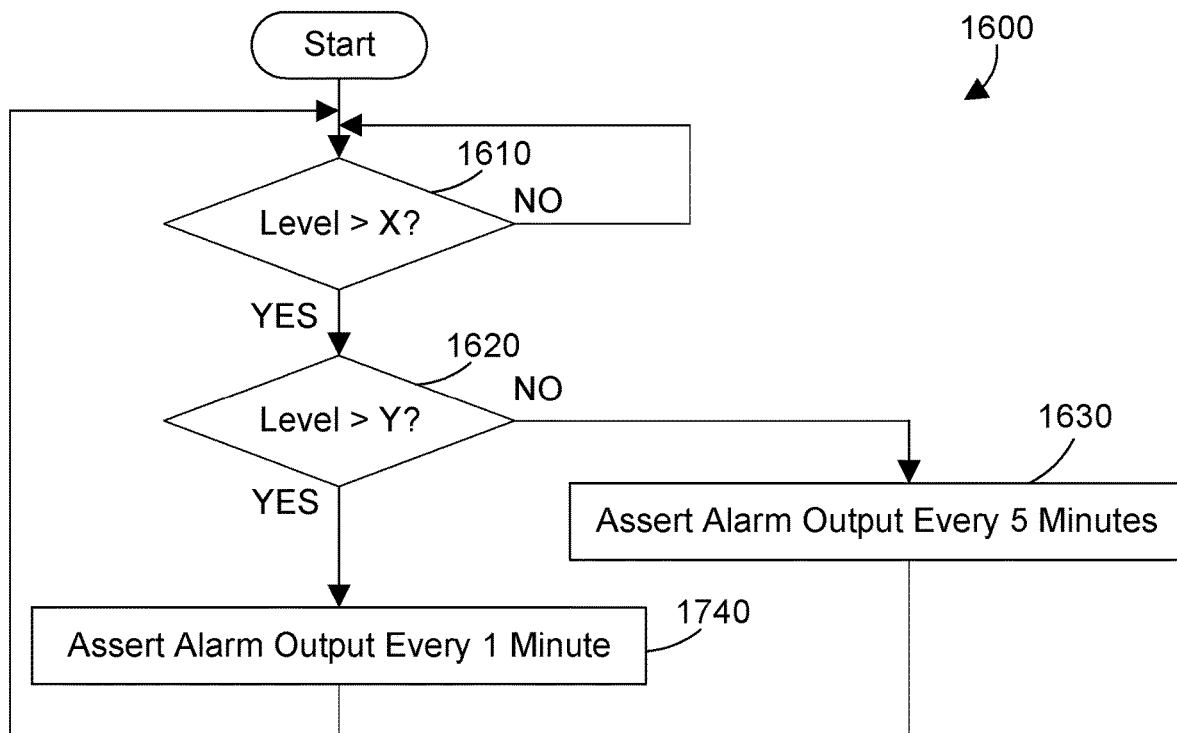
FIG. 16 is a flow diagram of a method for the level sensor in FIG. 14 to function according to the alarms programmed in FIG. 15.

FIG. 15 is a flow diagram of an example method 1500 for programming multiple alarms into a level sensor, such as an iTracker level sensor. For this specific example, the level sensor has a first alarm called Alarm1 that is programmed to be asserted every five minutes when the level detected by the level sensor is greater than a first defined threshold X (step 1510). The level sensor also has a second alarm called Alarm2 that is programmed to be asserted every one minute when the level is greater than a second defined threshold Y (step 1520). For this example, we assume the camera does not take any photos as long as the level is less than the first threshold X. Once the level exceeds the first threshold X but is less than the second threshold Y, the alarm output is asserted every five minutes. Once the level exceeds the second threshold Y, the alarm output is asserted every one minute. The logic here is clear. When the level is normal, no photos are taken because monitoring normal levels typically is not needed. When the level is between the first and second threshold, one photo every five minutes is taken. When the level is above the second threshold, one photo every minute is taken. This is shown as method 1600 in FIG. 16. When the level is not greater than the first threshold X (step 1610=NO), method 1600 loops back to step 1610 until the level exceeds this first threshold X (step 1610=YES). When the level is not greater than the second threshold Y (step 1620=NO), this means the level is between the first threshold X and the second threshold Y, so the alarm output is asserted every 5 minutes (step 1630). When the level is greater than the first threshold X (step 1610=YES) and greater than the second threshold Y (step 1620=YES), the alarm output is asserted every one minute (step 1640). The logic in the level sensor shown in FIGS. 15 and 16 allow the level sensor to monitor level of material in the wastewater pipe, then control the camera accordingly to preserve the battery life of the camera.

Figure 17:
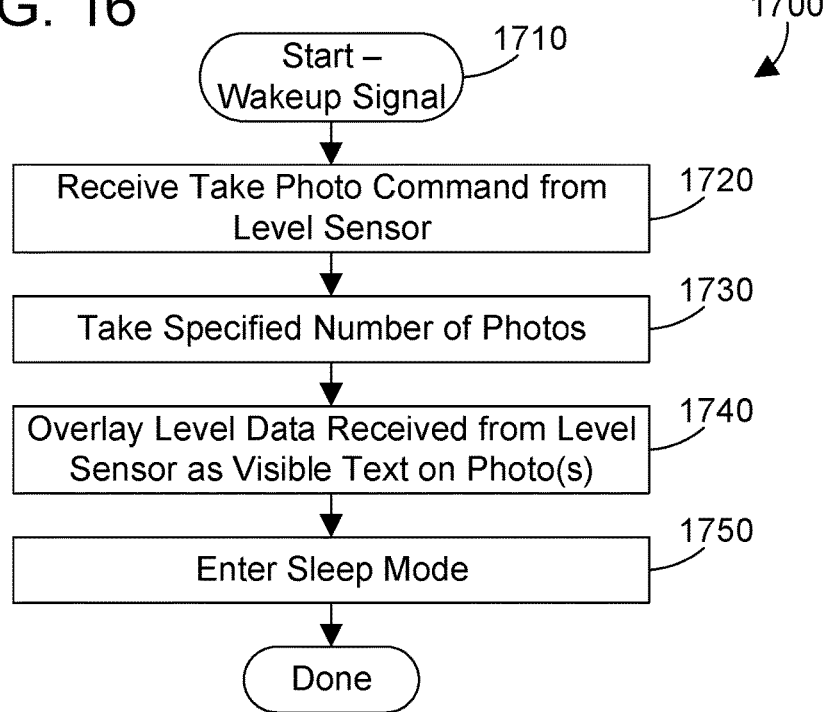
FIG. 17 is a flow diagram of one suitable method for the camera to function when woken up by the level sensor.

Referring to FIG. 17, a method 1700 represents steps performed by the camera. Method 1700 starts when camera 1310 receives a wakeup signal on its wakeup interface 1450 (step 1710). The cameral receives a "Take Photo" command from the level sensor (step 1720). In response, the camera takes a specified number of photos (step 1730), which can be a single photo, multiple photos, or a video. Level data received by the camera from the level sensor is overlaid as visible text on one or more of the photos or video (step 1740). Level data received from the level sensor that can be overlaid on the photo(s) in step 1740 include time and date, location, and level determined by the level sensor. Of course, other data could also be received from the level sensor and overlaid on the photo(s) within the scope of the disclosure and claims herein. The camera then enters sleep mode (step 1750) until it receives another wakeup signal (step 1710). By the camera waiting to be woken up by the level sensor before taking a picture, the camera's battery power is not wasted capturing images of normal conditions.

The number of photos taken in step 1720 can be specified as an operational parameter in the camera, or can be sent to the camera as a parameter to the command the camera receives from the level sensor to take a photo. In the most preferred implementation, the specified number of photos in step 1720 is one, which means the camera wakes up, takes one photo, overlays the level data received from the level sensor as visible text on the one photo, then goes back to sleep. Because the camera is only awake for a very short time each time it is woken up, the battery life is drastically improved, allowing a camera to function for many months, perhaps over a year, before battery replacement in the camera is required. While the default operation of the camera may be to take one photo when woken up, this default can be overridden by the wastewater control system interacting with the camera or the level sensor interacting with the camera to specify a number of photos greater than one that is taken each time the camera wakes up, or to specify a video be taken for a specified length of time.

Figure 18:
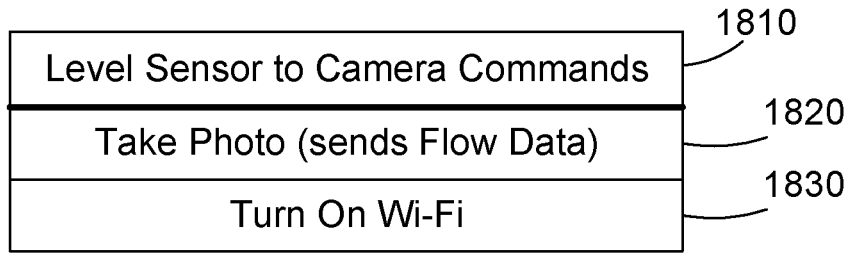
FIG. 18 is a table that shows examples of suitable commands from the level sensor to the camera.

Step 1720 in FIG. 17 refers to a Take Photo command. The Take Photo command is one suitable example of a level sensor to camera command, as shown at 1820 in table 1810 in FIG. 18. The Take Photo command 1820, which instructs the camera to take one or more photos or a video, as discussed above. The Take Photo command 1920 may include a parameter that specifies a number of photos to take, or a length of video to take. However, as discussed above, the most preferred implementation is for the camera to take a single photo when it receives the Take Photo command 1820 from the level sensor. Note that the Take Photo command 1820 will be followed by the level sensor sending level data to the camera. A second command the level sensor can send to the camera is a Turn On Wi-Fi command 1830, which instructs the camera to turn on its Wi-Fi interface. Once the camera turns on its Wi-Fi interface, the wastewater control system can interact directly with the camera to perform several functions, as discussed in more detail below, such as downloading photos from the camera directly at high speed.

The iTracker level sensor includes a Wi-Fi interface that turns on every five minutes to determine whether anything is trying to communicate with the iTracker level sensor. This feature allows the iTracker level sensor to further control the function of the camera, as shown in method 1900 in FIG. 19. The level sensor turns on its Wi-Fi interface every X minutes, such as five minutes (step 1910). The wastewater control system sends a message to the Wi-Fi interface of the level sensor until the message is acknowledged by the level sensor (step 1920), which happens once the level sensor turns on its Wi-Fi interface in step 1910, receives the message, and acknowledges the message. The level sensor sends a wakeup message to the camera (step 1930). The level sensor sends a camera command to the camera to turn on its Wi-Fi interface (step 1940).

Figure 19:
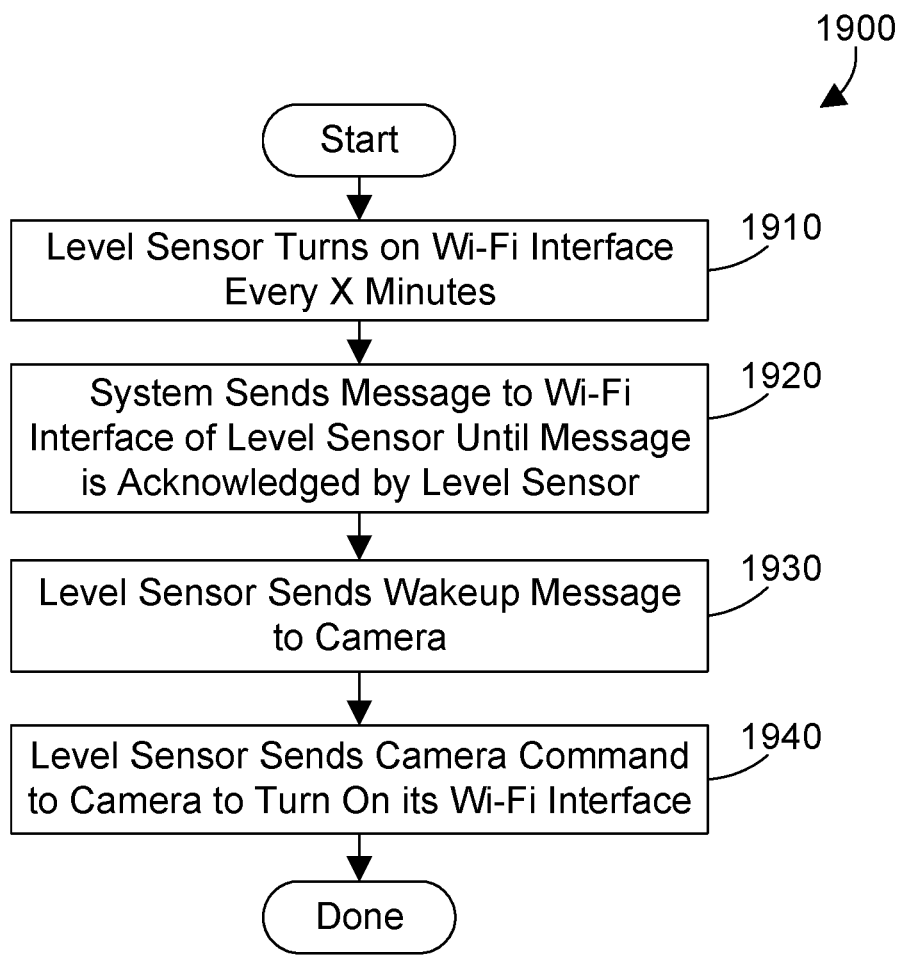
FIG. 19 is a flow diagram of a method showing interaction between a wastewater control system on a remote computer system, the level sensor and the camera.
Figure 20:
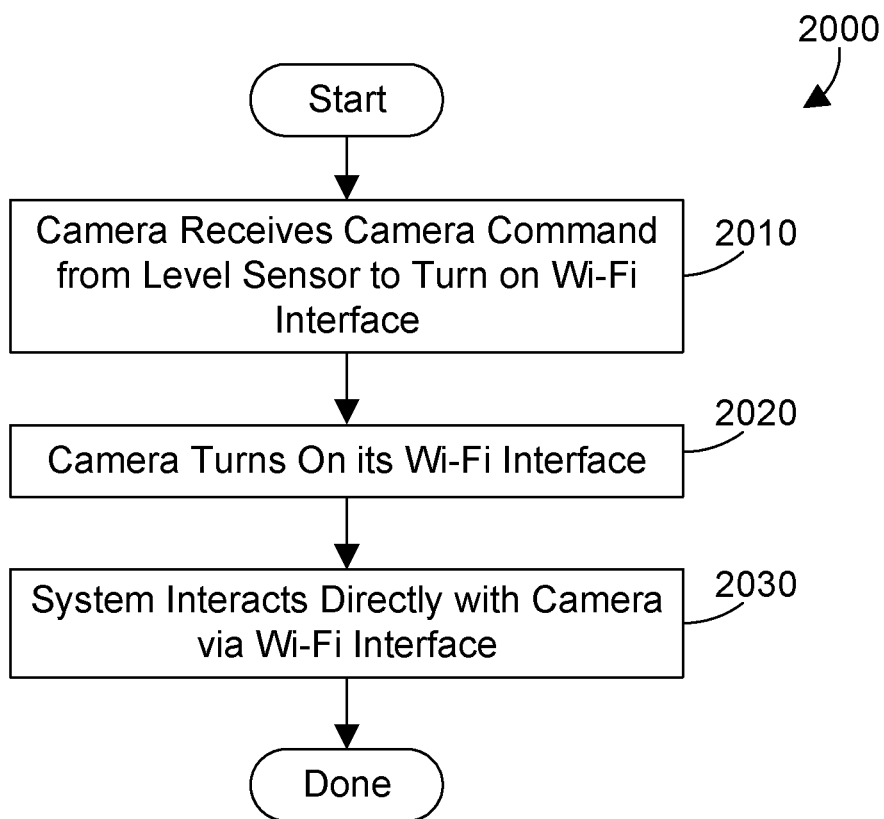
FIG. 20 is a flow diagram of a method for the wastewater control system to interact with the camera via Wi-Fi.

Method 2000 in FIG. 20 shows what happens in response to the camera receiving a camera command from the level sensor to turn on its Wi-Fi interface (step 2010), which occurs, for example, in step 1940 in FIG. 19. Referring back to FIG. 20, in response, the camera turns on its Wi-Fi interface (step 2020). The wastewater control system can then interact with the camera directly via the Wi-Fi interface (step 2030), which allows the wastewater control system to interact with and control the camera. When the camera is connected to the wastewater control system via its Wi-Fi interface, the camera acts as a web server so the camera can be accessed and controlled via any suitable web browser. This eliminates the requirement for a specialized program to setup and control the camera. Of course, a specialized program could also be used, but the preferred implementation is for the camera to provide web server interface so any suitable browser can be used.

Figure 21:
FIG. 21 is a table that shows examples of suitable commands from the wastewater control system to the camera.

The wastewater control system can define any suitable command to interact with the camera. Examples of suitable commands from the wastewater control system to the camera are shown in table 2110 in FIG. 21, and include a Send Camera Status command 2120; a List Photos command 2130; a Send All Photos command 2140; a Send Specified Photos command 2150; a Delete All Photos command 2160; and a Delete Specified Photos command 2170. The Send Camera Status command 2120, when received by the camera, causes the camera to send any suitable status information, such as battery state, the amount of photo memory used, the amount of photo memory available, current operational settings, etc. The List Photos command 2130, when received by the camera, causes the camera to send to the wastewater control system a list of the photos in its memory. The Send All Photos command 2140, when received by the camera, causes the camera to send to the wastewater control system all the photos in its memory. The Send Specified Photos command 2150, when received by the camera, causes the camera to send to the wastewater control system a subset of specified photos in its memory. The photos may be specified in any suitable way in the Send Specified Photos command, including photo name, date, time, etc. The photos may also be specified using any suitable wildcard. Thus, one suitable example of a send specified photos command 2150 could specify to send all photos that begin with D456 in the filename that were taken between two specified dates. The Delete All Photos command 2160, when received by the camera, causes the camera to delete all photos in its memory. The Delete Specified Photos command 2170, when received by the camera, causes the camera to delete photos that match criteria in the command, similar to the criteria in the Send Specified Photos command 2150 discussed above. Of course, other system to camera commands could be included, and are within the scope of the disclosure and claims herein. In one suitable example, the wastewater control system could send a List Photos command 2130 to determine the list of stored photos in the camera, followed by a Send All Photos command 2140 to transfer all photos stored in the camera to the wastewater control system, followed by a Delete All Photos command 2160 to delete the photos stored in the camera after they are successfully transferred to the wastewater control system.

Providing a camera that is controlled by a level sensor such as an iTracker provides some significant advantages. By making the camera a slave to the iTracker level sensor, the battery life of the camera is significantly improved. The camera need not turn on its Wi-Fi interface to communicate with the wastewater control system until the iTracker sends a command for the camera to turn on its Wi-Fi interface. Once the camera turns on its Wi-Fi interface, the wastewater control system can interact with the camera to check status, retrieve photos, delete photos, etc. The result is an efficient wastewater monitoring system that is very simple to program and use and is inexpensive when compared to systems that provide similar functionality.

Figure 22:
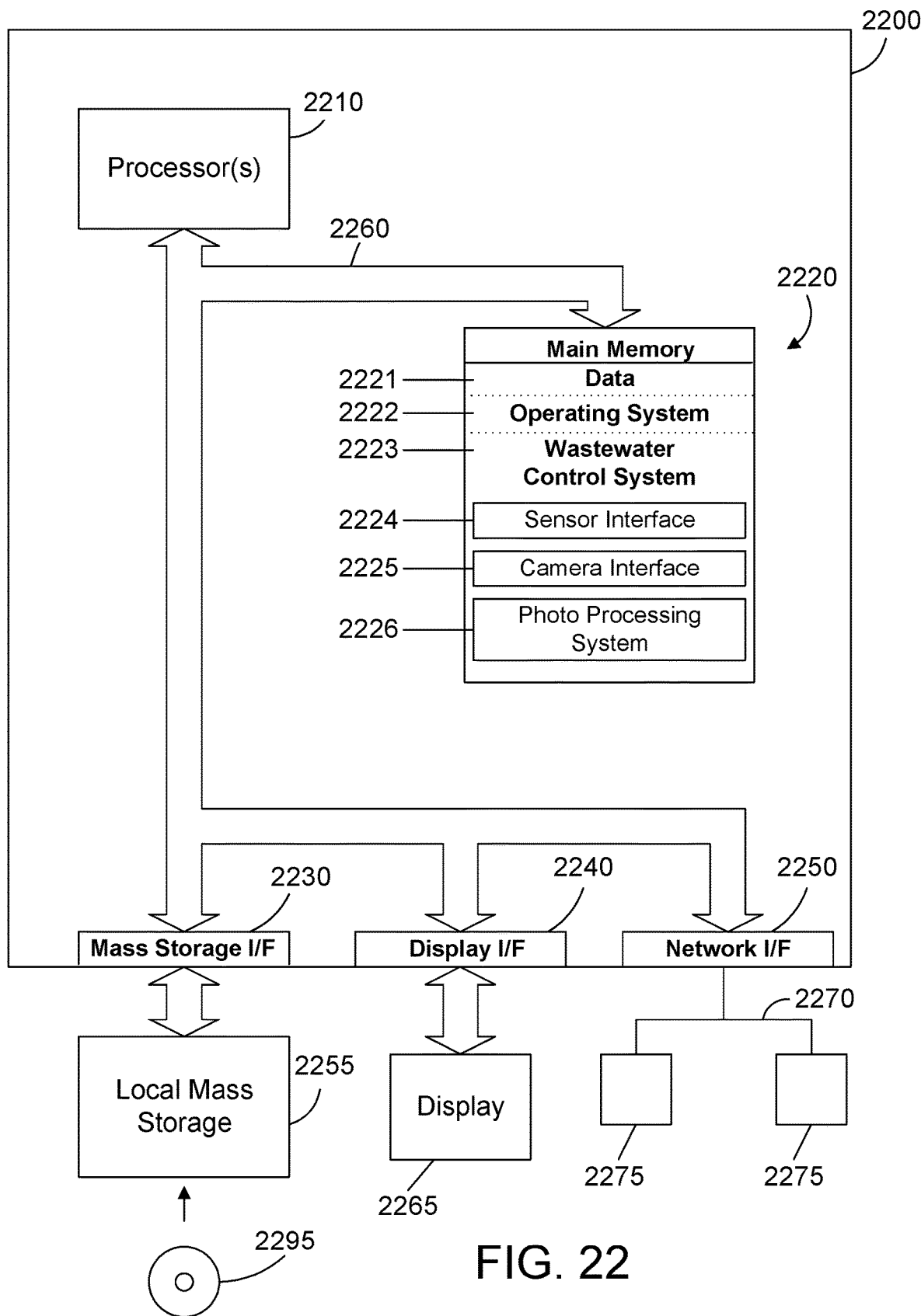
FIG. 22 is a block diagram of a computer apparatus that includes a wastewater control system that can communicate with sensors, cameras, and that processes the photographs retrieved from a camera in a wastewater pipe.

The photographs retrieved from a camera can be received and processed on a separate computer system, such as a desktop or laptop computer system. Referring to FIG. 22, computer system 2200 is representative of any suitable computer system that could communicate with a sensor, communicate with one or more cameras, and analyze photographs, including without limitation a desktop computer, a laptop computer, a tablet computer, and a smart phone. Computer system 2200 could be, for example, a Window-based computer system. However, those skilled in the art will appreciate that the disclosure herein applies equally to any computer system, regardless of whether the computer system is a complicated multi-user computing apparatus, a single user workstation, or an embedded control system. As shown in FIG. 22, computer system 2200 comprises one or more processors 2210, a main memory 2220, a mass storage interface 2230, a display interface 2240, and a network interface 2250. These system components are interconnected through the use of a system bus 2260. Mass storage interface 2230 is used to connect mass storage devices, such as local mass storage device 2255, to computer system 1400. One specific type of local mass storage device 2255 is a readable and writable CD-RW drive, which may store data to and read data from a CD-RW 2295.

Main memory 2220 preferably contains data 2221, an operating system 2222, and a wastewater control system 2223. Data 2221 represents any data that serves as input to or output from any program in computer system 2200. Operating system 2222 is a multitasking operating system. Wastewater control system 2223 is computer software that includes a sensor interface 2224 for communicating with one or more sensors, such as level sensors discussed above, a camera interface 2225 for communicating with one or more cameras, and a photo processing system 2226 for processing photos received from one or more cameras. The camera interface 2225 allows communicating directly with a camera, such as via a Wi-Fi interface. This allows the wastewater control system 2223 to see what the camera sees, and to change or adjust the function of the camera. For example, the brightness of the illuminator(s) in the camera could be reduced while increasing the brightness of the camera exposure, to preserve battery life of the camera. In addition, the wastewater control system 2223 can see what the camera sees by the camera streaming live video to the camera interface 2225. This allows remotely determining the quality of the photographs or video being taken by the camera, and adjusting one or more parameters that control the function of the camera, as needed.

Computer system 2200 utilizes well known virtual addressing mechanisms that allow the programs of computer system 2200 to behave as if they only have access to a large, contiguous address space instead of access to multiple, smaller storage entities such as main memory 2220 and local mass storage device 2255. Therefore, while data 2221, operating system 2222, and wastewater control system 2223 are shown to reside in main memory 2220, those skilled in the art will recognize that these items are not necessarily all completely contained in main memory 2220 at the same time. It should also be noted that the term "memory" is used herein generically to refer to the entire virtual memory of computer system 2200, and may include the virtual memory of other computer systems coupled to computer system 2200.

Processor 2210 may be constructed from one or more microprocessors and/or integrated circuits. Processor 2210 executes program instructions stored in main memory 2220. Main memory 2220 stores programs and data that processor 2210 may access. When computer system 2200 starts up, processor 2210 initially executes the program instructions that make up operating system 2222. Processor 2210 also executes the wastewater control system 2223.

Although computer system 2200 is shown to contain only a single processor and a single system bus, those skilled in the art will appreciate that a wastewater control system as described herein may be practiced using a computer system that has multiple processors and/or multiple buses. In addition, the interfaces that are used preferably each include separate, fully programmed microprocessors that are used to off-load compute-intensive processing from processor 2210. However, those skilled in the art will appreciate that these functions may be performed using I/O adapters as well.

Display interface 2240 is used to directly connect one or more displays 2265 to computer system 2200. These displays 2265, which may be non-intelligent (i.e., dumb) terminals or fully programmable workstations, are used to provide system administrators and users the ability to communicate with computer system 2200. Note, however, that while display interface 2240 is provided to support communication with one or more displays 2265, computer system 2200 does not necessarily require a display 2265, because all needed interaction with users and other processes may occur via network interface 2250.

Network interface 2250 is used to connect computer system 1400 to other computer systems or workstations 2275 via network 2270. Network interface 2250 broadly represents any suitable way to interconnect electronic devices, regardless of whether the network 2270 comprises present-day analog and/or digital techniques or via some networking mechanism of the future. Network interface 2250 preferably includes a combination of hardware and software that allows communicating on the network 2270. Software in the network interface 2250 preferably includes a communication manager that manages communication with other computer systems 2275 via network 2270 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 2250.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 23:
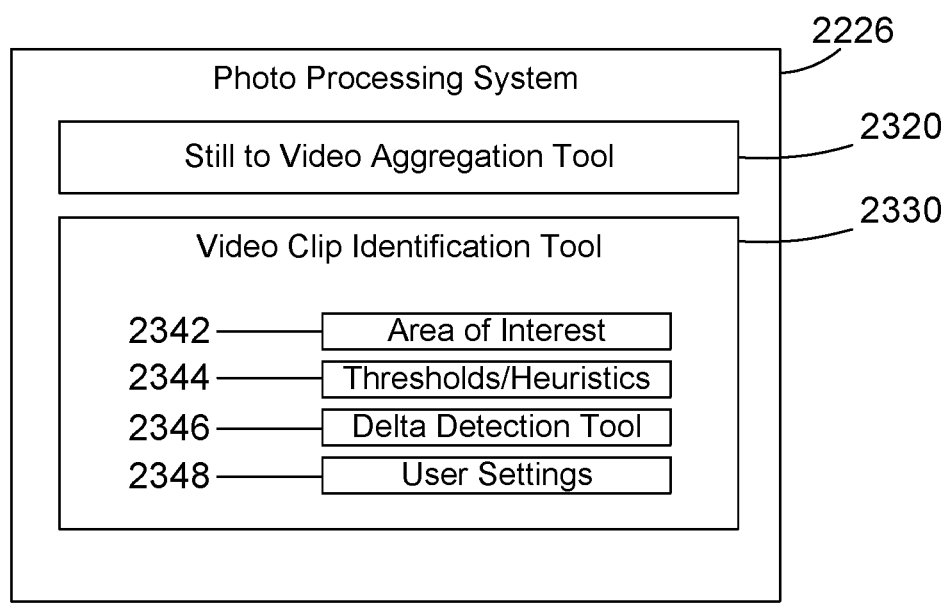
FIG. 23 is a block diagram showing suitable features of the photo processing system shown in FIG. 22.

FIG. 23 shows one specific implementation for the photo processing system 2226 shown in FIG. 22. The photo processing system 2226 is software that processes photographs taken by one or more installed cameras to help a user identify potential problems based on level of water in a pipe. The photo processing system 2226 includes a still to video aggregation tool 2320, and a video clip identification tool 2330. The still to video aggregation tool 2320 simply puts all of the photographs retrieved from an installed camera into time order in a video stream. Note, however, the video stream could include many hours of data that would be very tiresome for a human user to view. Even though the camera only took one photo each time interval, such as five minutes, the resulting video stream after aggregating the photographs over days or weeks could be many hours long. So one of the helpful features of the photo processing system 2226 is to help identify video clips that may be of interest to the user. The video clip identification tool 2330 allows a user to define an area of interest 2342 on one of the photographs. Once the area of interest is defined by the user, the video clip identification tool 2330 can use any suitable threshold or heuristic 2344 to compare photographs to determine which photographs have sufficient differences to merit viewing by a user. For example, the pixel values in a photograph could be compared to the pixel values in the preceding photograph in time. When a defined number of pixels in the area of interest are different than the corresponding pixels in the preceding photograph, the change can be detected by a delta detection tool 2346. The delta detection tool 2346 detects deltas, or changes, in a video stream based on a mathematical analysis that is performed using defined thresholds and/or heuristics 2344. The video clip identification tool 2330 also functions according to defined user settings 2348. The user settings 2348 provide a user with some adjustment capability for the photo processing system 2226. The user settings could include specifying a number of seconds or minutes to display before and after detected changes, how changes are detected, etc. Thus, in a first pass, the user could specify a relatively high threshold with a relatively short number of minutes before and after the changes to display. If the result is short video clips that do not provide enough information to the user, the user could then specify a lower threshold with a longer number of minutes before and after the changes to display. The user settings 2348 thus provide a way for the user to adjust the function of the photo processing system 2226 according to the user's preferences.

Figure 24:
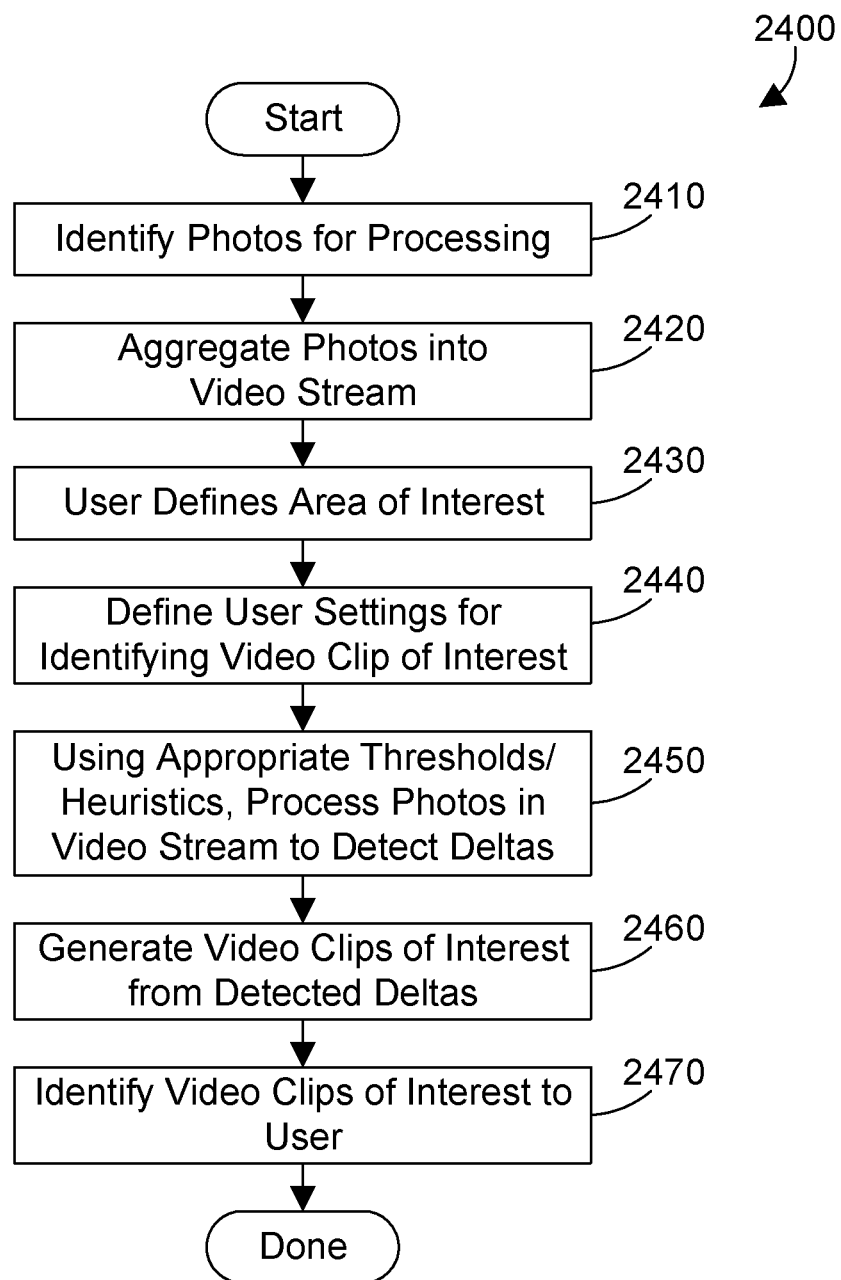
FIG. 24 is a flow diagram of a method for identifying video clips of interest to a user from a larger set of photographs using detected deltas (changes)

Referring to FIG. 24, a method 2400 represents steps that could be performed by the photo processing system 2226 shown in FIGS. 22 and 23. Photos are identified for processing (step 2410). One way to identify photos for processing is according to how the photos are stored. For example, photos stored on an external storage medium, such as an SD card, could all be identified as photos to be processed. Folders or directories could also identify photos for processing. Of course, the user could also use a software tool to identify photos for processing by selecting a group of photos for processing. The identified photos are aggregated into a video stream (step 2420). This could be done, for example, by the still to video aggregation tool 2324 in FIG. 23. The user then defines an area of interest (step 2430). The user can define an area of interest in any suitable way. For example, the user could allow the photo processing system to determine a normal flow area in most of the photographs, and define an area of interest to be anything outside the normal flow area. In the alternative, the user could use a mouse or other pointing device to graphically designate an area of interest, as illustrated below with reference to FIGS. 35-37. The user may also define user settings for identifying the video clip of interest (step 2440). Using appropriate thresholds, heuristics or other algorithms, the photos in the video stream are processed to detect deltas (or changes) (step 2450). Deltas are defined by differences between adjacent photos, and can be determined using any suitable function, including pixel color, pixel brightness, a histogram function, or any other suitable function for processing photographs. Once deltas are detected, one or more video clips of interest are generated from the detected deltas (step 2460). The video clips of interest are then identified to the user (step 2470). The user can then view the video clips of interest to determine water levels in the pipe being monitored at times when the water level changed. Method 2400 provides a significant advance over the known art by automatically filtering through a large number of photographs that are not statistically significant in determining differences in water levels and efficiently identifying video clips of interest that are most likely to show water levels of interest according to the detected deltas and the user settings.

Detecting deltas in step 2450 and generating video clips of interest in step 2460 may be done in any suitable manner. For example, two photographs could be identified that have the single biggest delta, and a video clip could be generated that includes a specified number of minutes or photographs before and after the detected delta. Another suitable way to detect deltas is using some average over a number of photographs. Thus, pixel values could be averaged over a sliding window of ten photographs, and when the next photograph processed has a delta that exceeds some threshold when compared to the average of the ten previous photographs, the delta can be marked, and a video clip of interest can be generated by including the delta and including a specified number of minutes or photographs before and after the detected delta. This includes computing an average pixel value over a predefined number of photographs and determining when a plurality of pixels in a photograph exceeds the computed average pixel value by some defined threshold. Of course, many other algorithms could be used to detect deltas and to generate from the detected deltas video clips of interest. The disclosure and claims herein expressly extend to any suitable manner for detecting deltas in a group of identified photographs, and to any suitable manner for generating video clips of interest from the detected deltas.

Figure 25:
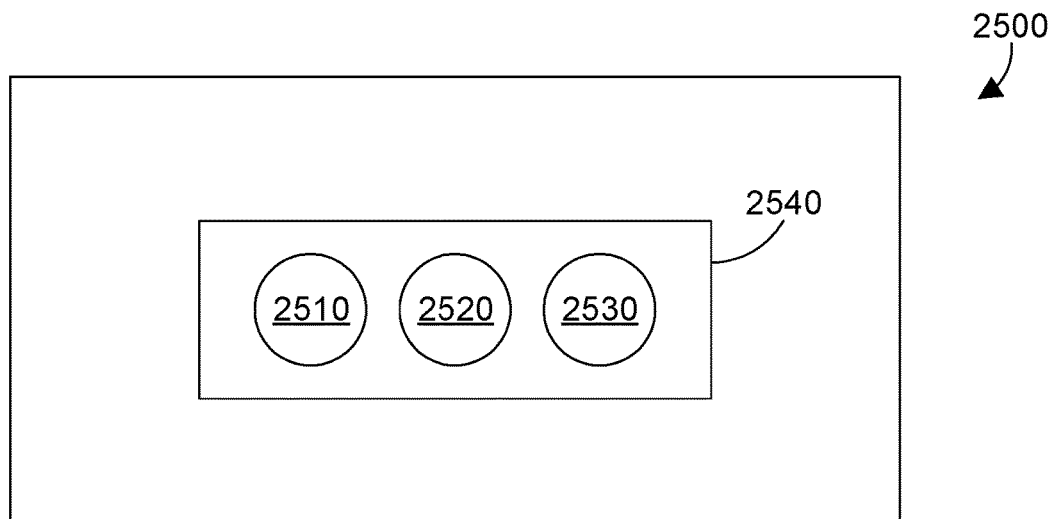
FIG. 25 is a front view of a camera housing that includes multiple lenses.
Figures 26, 27:
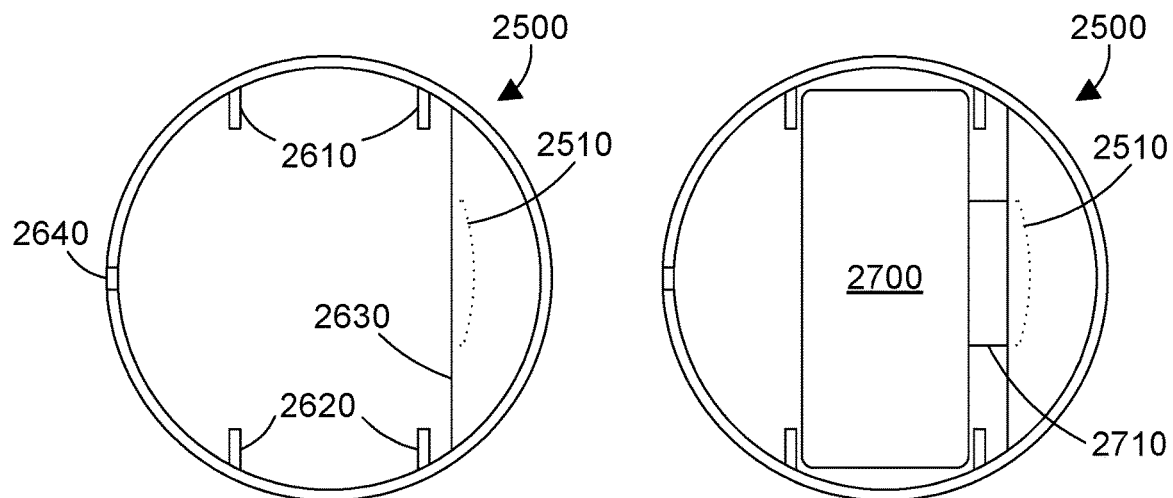
FIG. 26 is a side view of the camera housing shown in FIG. 25.
FIG. 27 is a side view of the camera housing shown in FIGS. 25 and 26 with a camera installed.

While the specific camera shown in FIGS. 1-4 and 7 and described above could be used, other cameras could also be used as well, such as camera 1310 shown in FIGS. 13 and 14. Due to the harsh environmental conditions in a wastewater pipe, a camera needs to be sealed in an air-tight and gas-tight housing. One suitable housing 2500 is shown in FIG. 25. Housing 2500 is preferably cylindrical in shape, and in the embodiment shown in FIG. 25 includes a recess 2540 that includes a plurality of lenses 2510, 2520 and 2530. In this embodiment with three lenses, the first lens 2510 could be a wide-angle lens, the second lens 2520 could be a standard lens, and the third lens 2530 could be a telephoto lens. The lenses 2510, 2520 and 2530 could be integrally formed with the same material as the housing, or could be separate pieces bonded to the housing. For example, if the housing is made of Lexan, the lenses could be molded into the housing. The housing 2500 preferably includes internal ribs 2610 and 2620 as shown in FIG. 26 that serve to align a camera properly within the housing. Ribs 2610 and 2620 are examples of suitable registration features that align a camera within the housing. A flat front surface 2630 is placed in a position such that when a camera 2700 is properly slid between the internal ribs 2610 and 2620 as shown in FIG. 27, the lens 2710 of the camera will align with one of the lenses, such as 2510 shown in FIG. 18. Note that housing 2500 preferably includes one or more threaded inserts 2640 for attaching the housing to a direction orientation mechanism, such as a ball joint.

Figure 28:
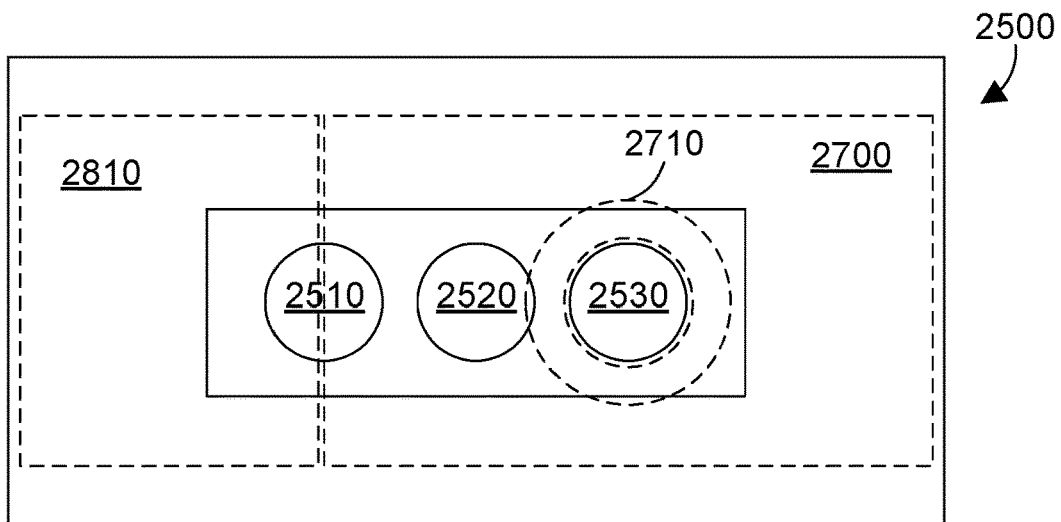
FIG. 28 is a front view of the camera housing with a camera installed to align with the third lens in the camera housing.
Figure 29:
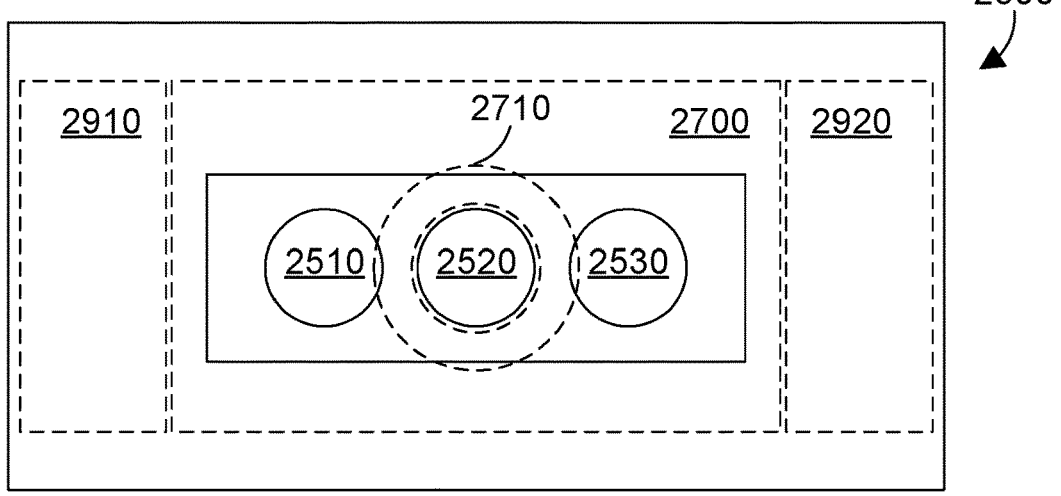
FIG. 29 is a front view of the camera housing with a camera installed to align with the second lens in the camera housing.
Figure 30:
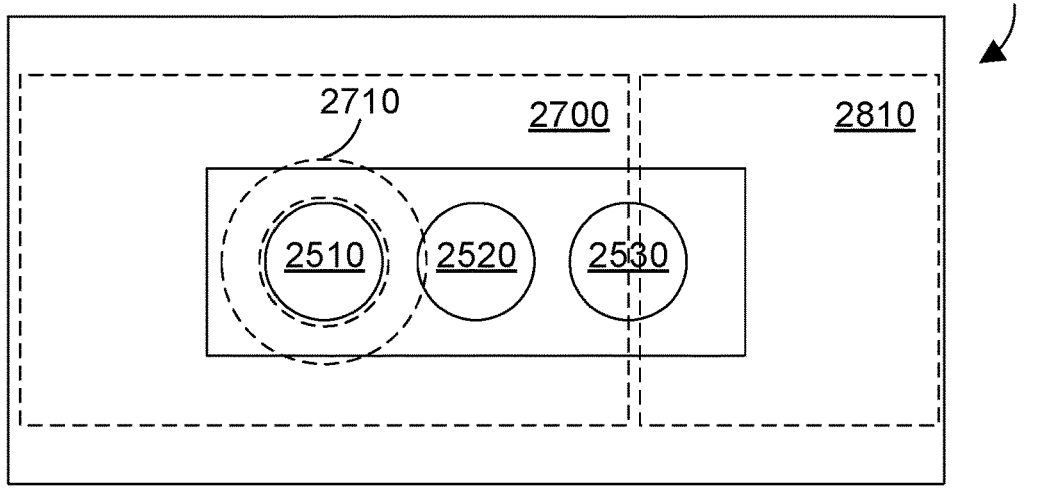
FIG. 30 is a front view of the camera housing with a camera installed to align with the first lens in the camera housing.

Which of the three lenses are used depends on spacer blocks. Referring to FIG. 28, the lens 2710 of the camera 2700 is aligned over the third lens 2530 when a spacer block 2810 is used as shown. Referring to FIG. 29, the lens 2710 of the camera 2700 is aligned over the second lens 2520 when two spacer blocks 2910 and 2920 are placed on each side of the camera 2700 as shown. Referring to FIG. 30, the lens 2710 of the camera 2700 is aligned over the first lens 2510 when the spacer block 2810 shown in FIG. 28 is placed on the opposite side of the camera, as shown in FIG. 30. These spacer blocks could be made of any suitable material. In addition, the spacer blocks could also include batteries so the spacer blocks also act as battery packs for the camera. A connection could be made from the camera to one or more battery pack spacer blocks using a suitable cable, or using electrical contacts on the camera that contact corresponding electrical contacts on the battery pack spacer block(s) such that when they are properly installed, the battery pack spacer block(s) provide power to the camera.

Figure 31:
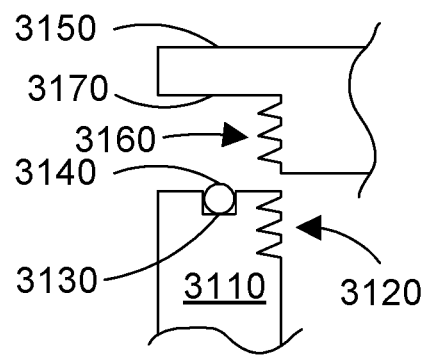
FIG. 31 is a view showing a removable lid for the camera housing that provides a water-tight and gas-tight seal.
Figure 32:
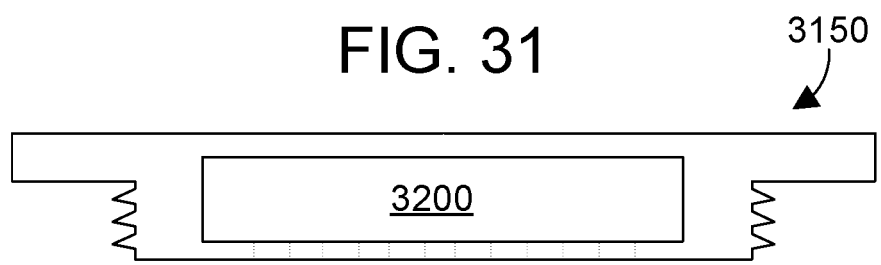
FIG. 32 is a side cross-sectional view of a removable lid for the camera housing that includes a desiccant compartment.
Figure 33:
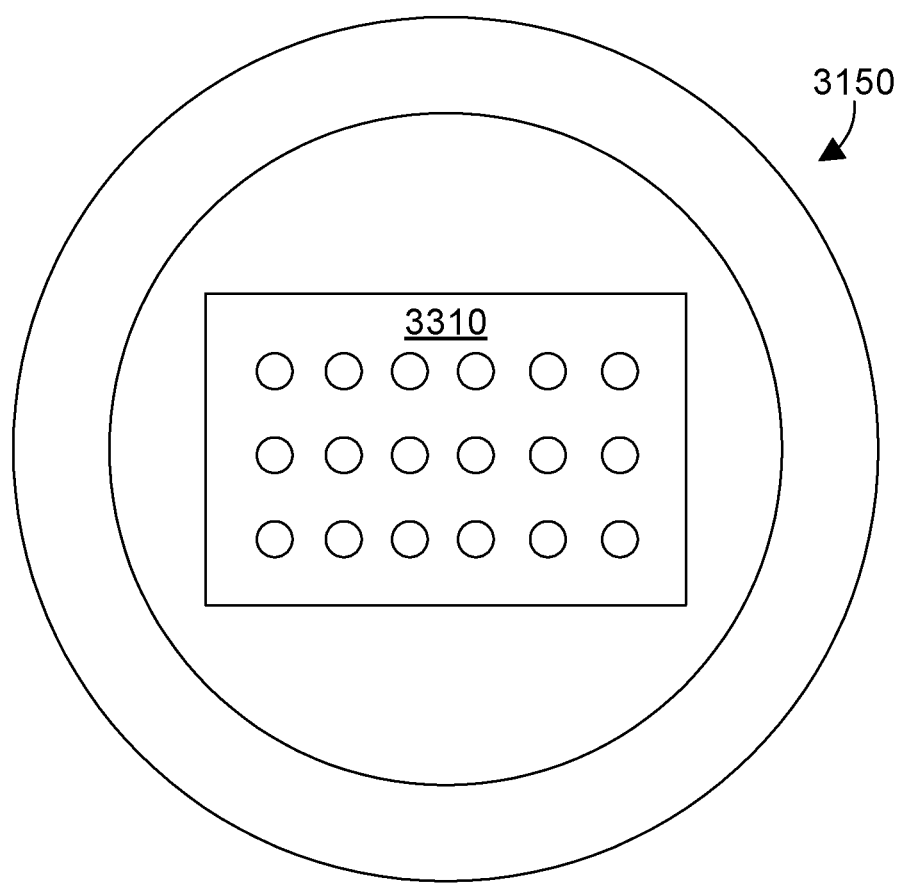
FIG. 33 is a bottom view of the removable lid shown in FIG. 32.

One or both ends of the housing 2500 shown in FIGS. 25-30 could include a water-tight and gas-tight cap. One suitable configuration for such a water-tight and gas-tight cap is shown in FIGS. 31-33. FIG. 31 shows a side wall 3110 of the cylindrical housing 2500, which includes an internally-threaded portion 3120 and a groove 3130 that contains a circular rubber O-ring 3140, shown in cross-section in FIG. 31. The cap 3150 includes an externally-threaded portion 3160 and a flat portion 3170 such that when the cap is screwed into the threads 3120, the flat portion 3170 contacts the O-ring 3140 to create a water-tight and gas-tight seal, thereby protecting the enclosed camera from moisture.

In one specific configuration, the cap 3150 can include a compartment for desiccant, shown at 3200 in FIG. 32. The desiccant compartment 3200 preferably includes a lid 3310 that has multiple holes, as shown in FIG. 33, that allow air in the interior of the housing to communicate with desiccant compartment 3200, thereby drying the air inside the housing. By placing the desiccant compartment 3200 within the lid 3150, the desiccant in the lid can be changed when the lid is removed to open the housing. Including desiccant in the lid assures the air within the housing is dry.

Figure 34:
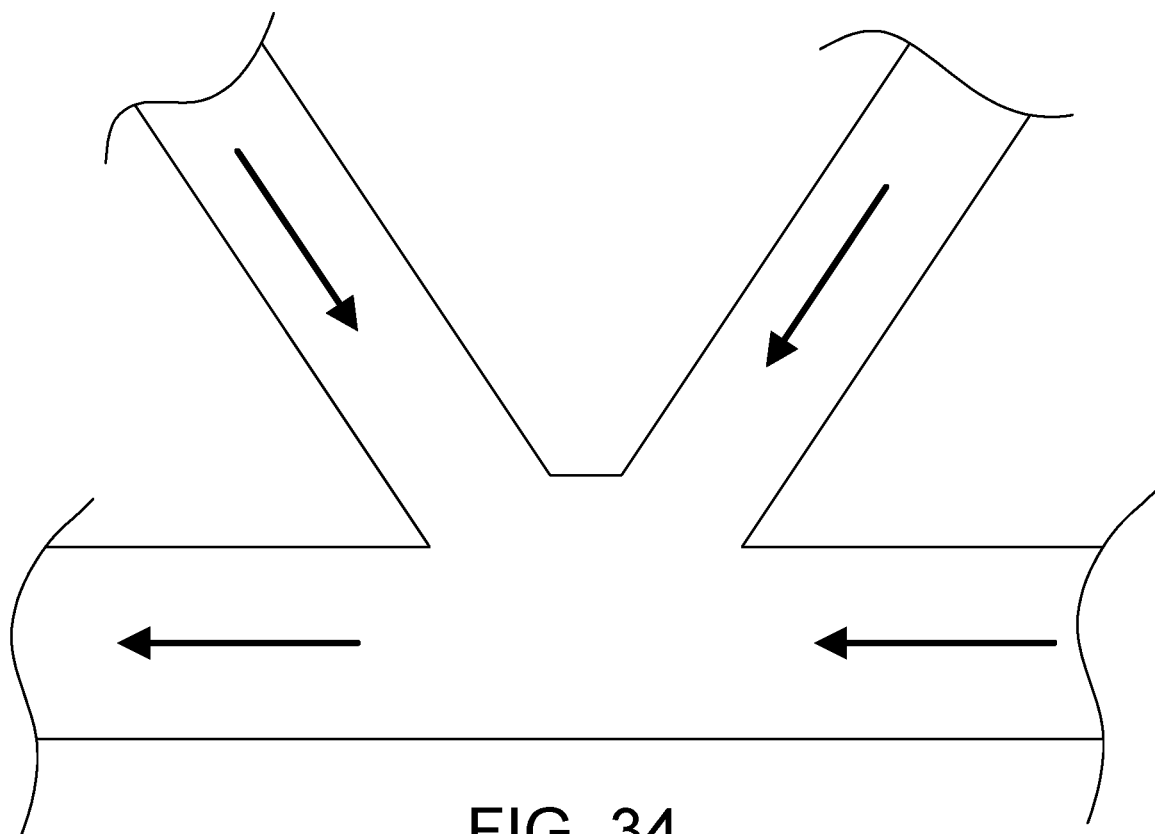
FIG. 34 is a sample wastewater junction that could be monitored using the wastewater monitoring system disclosed and claimed herein.
Figure 35:
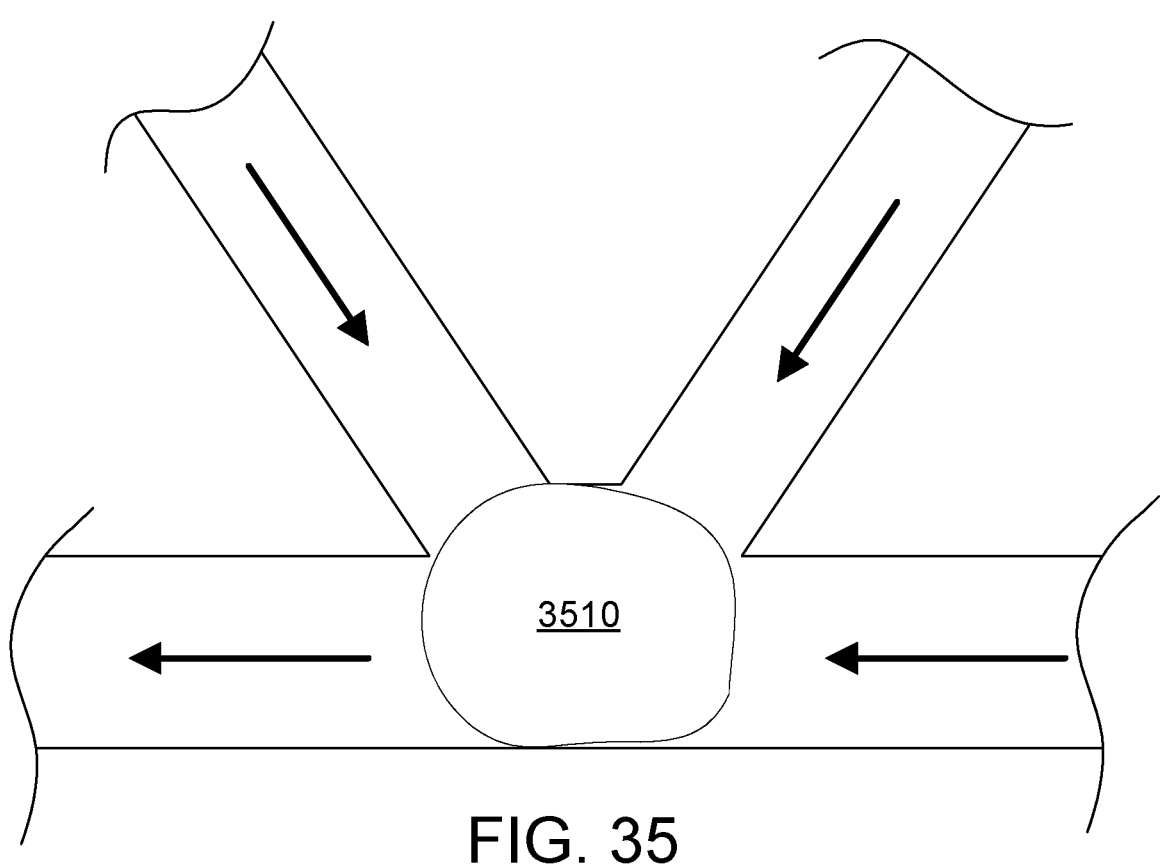
FIG. 35 shows how a user can define a first area of interest in the wastewater junction shown in FIG. 34.

One of the significant functions of the photo processing system is the ability to identify video clips of interest based on user settings and based on a defined area of interest. As discussed briefly above, the system can define an area of interest based on some mathematical or statistical analysis of the photos to be processed. In the alternative, the user can manually identify an area of interest. Referring to FIG. 34, we assume a camera is pointed towards a location of interest that includes three inflows and one outflow, as shown by the arrows in FIG. 34. Each photo will have some portions that do not change over time. For example, because the water levels in the pipes are of interest, all the areas between the pipes will not have any relevance to water levels in the pipes. Thus, the areas between the pipes could be ignored in the analysis. In addition, the user could use a mouse or other pointing tool to specifically identify one or more areas of interest. FIG. 35 shows an area of interest 3510 that was defined by a user using a mouse to draw a region that defines the area of interest 3510. Because this area of interest 3510 shown in FIG. 35 is the confluence of all three inflowing pipes to the one outflowing pipe, any change in the area of interest 3510 is likely to represent a change in water level. By defining area of interest 3510 in FIG. 35, the user can focus the analysis of the photo processing system on the area where changes are likely to be the most significant in relation to water level.

Figure 36:
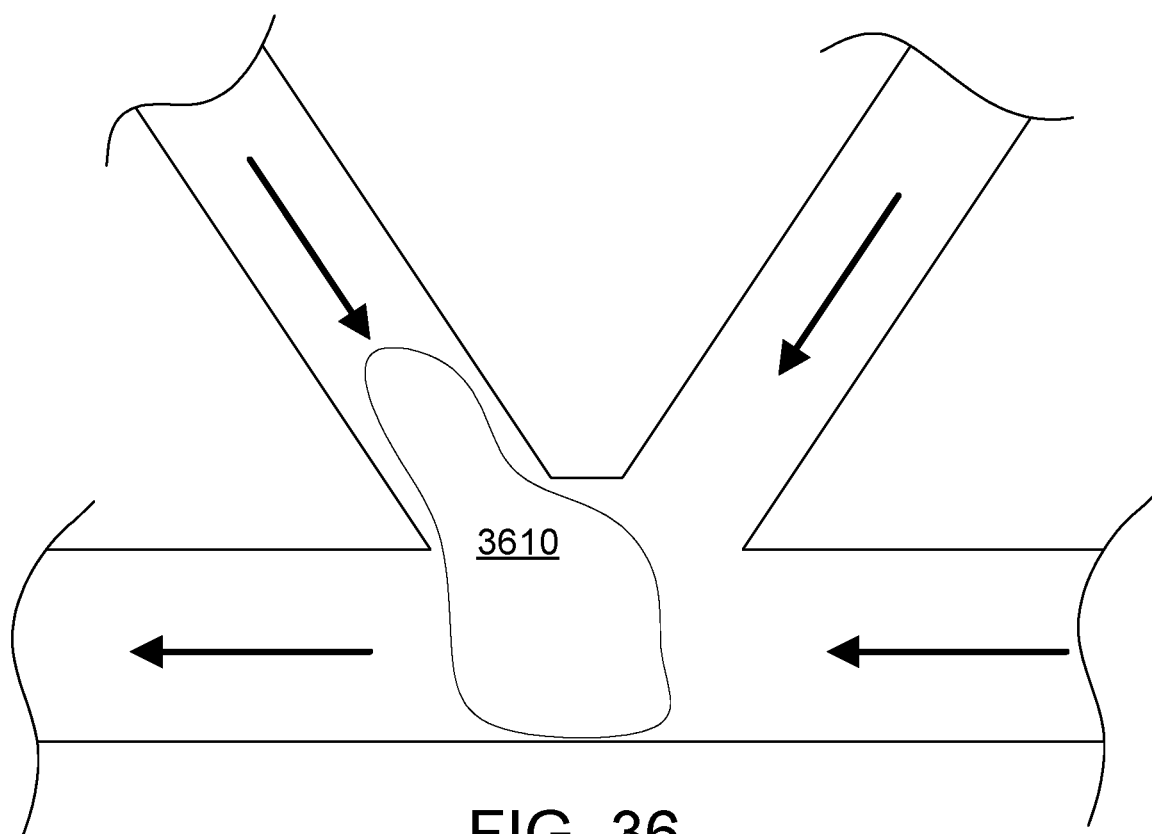
FIG. 36 shows how a user can define a second area of interest in the wastewater junction shown in FIG. 34.
Figure 37:
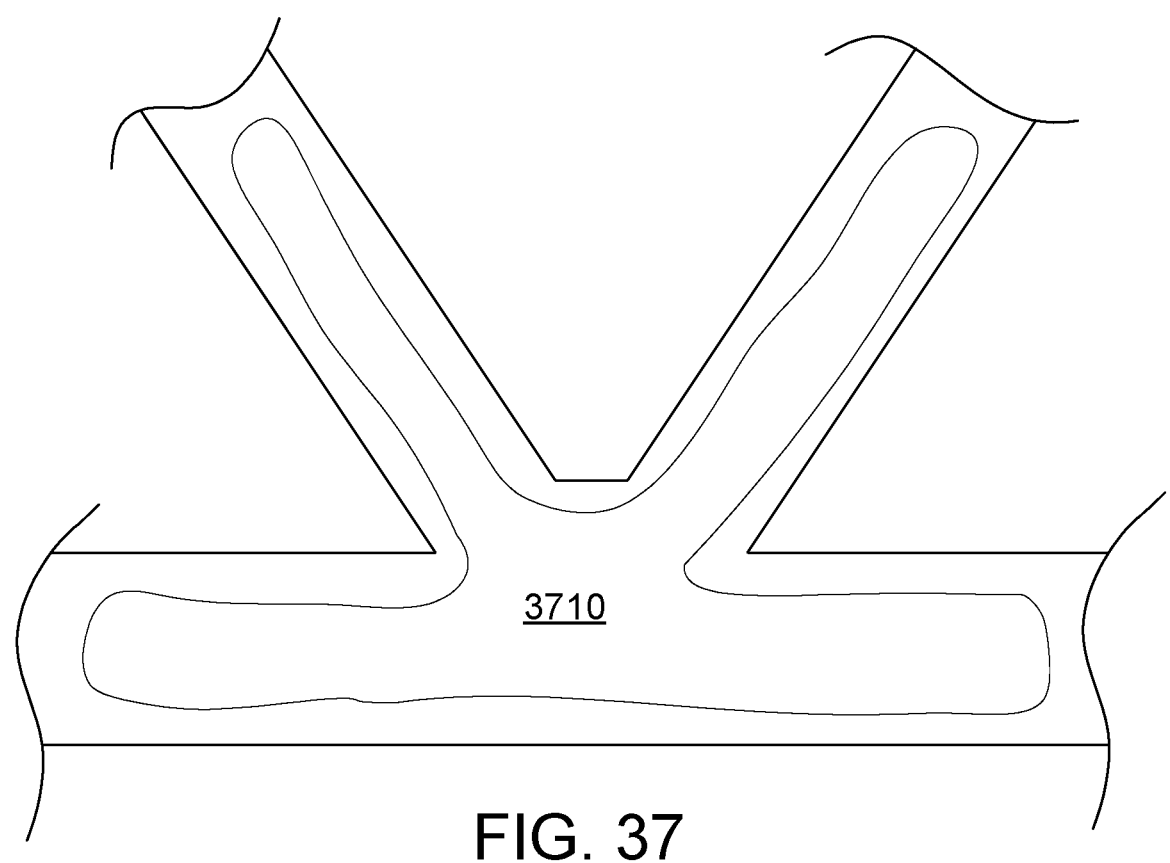
FIG. 37 shows how a user can define a third area of interest in the wastewater junction shown in FIG. 34.

FIG. 36 shows an alternative area of interest 3610 that could be defined by a user if the suspected leak is in the left-most inflow pipe, as shown in FIG. 36. Yet another way to define one or more areas of interest is by the user defining a normal flow region such as 3710 shown in FIG. 37, where everything outside the normal flow region 3710 is an area of interest. Notice that this is the opposite of what the user did in defining area of interest 3510 in FIG. 35 or 3610 in FIG. 36. Instead of outlining an area where differences in the water level are of interest, the user has defined in FIG. 37 an area where water levels are normal, thereby defining all areas outside the defined area 3710 as the areas of interest.

The wastewater monitoring system disclosed herein could be used in conjunction with other known sensors or products for monitoring wastewater systems, such as the iTracker level sensor discussed above. The wastewater monitoring system disclosed could receive an alert from the iTracker system, which could cause the wastewater monitoring system to begin taking photographs, to increase the time frequency of taking photographs, etc. Teledyne Isco makes area velocity flow modules that detect velocity of material in a pipe. Such a velocity flow module could send an alert to the wastewater monitoring system disclosed herein to cause a change in how the wastewater monitoring system functions. Thus, a wastewater monitoring system as disclosed herein could be installed in proximity to an area velocity flow module, and could be programmed to only take photographs when an enable signal is received from the system that includes the area velocity flow module. Of course, other functionality is also possible, such as increasing the frequency with which the wastewater monitoring system takes photographs when a given velocity threshold is exceeded by the area velocity flow module. Sensor interface(s) 1352 shown in FIG. 13 include any suitable interface to any suitable sensor that could be used with the wastewater monitoring system disclosed and claimed herein.

The wastewater monitoring system could also include a real-time connection to a network that allows sending alerts to changing conditions. For example, a manhole might be in a street in proximity to a café that offers free Wi-Fi, allowing the wastewater monitoring system to connect via its wireless interface to the café's Wi-Fi network. In addition, various cities have initiatives to have "smart cities" with various interconnected networks throughout the city. The camera could connect to one of these networks as well. Thus, when the camera detects water on its housing, a real-time alert could be sent indicating that is water on the camera housing. When the temperature sensor detects a change in temperature in the location of interest, a real-time alert could be sent. When the pressure sensor detects a change in pressure on the camera housing, a real-time alert could be sent to signal an overflow condition. In addition, the camera could use any or all of these conditions to change its own function in addition to sending the real-time alert(s). An operator could receive a real-time alert, such as an e-mail or a text message, which would then enable the operator to better understand the conditions where the wastewater monitoring system is installed. The video stream generated from the photographs could also be tagged to indicate to the user when the real-time alert occurred. This could be done by the camera itself, or by the photo processing system using timestamps to correlate the real-time alerts to the corresponding photograph or photographs in the video stream.

A wastewater monitoring system uses a camera in a fixed location in a wastewater pipe. The camera is coupled to a sensor that measures some characteristic of material in the wastewater pipe. The sensor is programmed with one or more alarms that, when triggered, cause the sensor to wake up the camera and command the camera to take one or more photos. Sensor data, such as current time/date, location, and the characteristics of material in the wastewater pipe, is sent by the sensor to the camera, which overlays one or more photos with visible text information corresponding to the received sensor data. The sensor can wake up the camera and command the camera to turn on the camera's Wi-Fi interface, which allows a wastewater control system in a remote location to communicate directly with the camera to retrieve camera status, to download photos from the camera, etc.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A digital camera comprising:
   an image sensor for taking a digital photograph and storing the digital photograph in a memory;
   a sensor interface coupled to a level sensor external to the digital camera, wherein the level sensor monitors level of wastewater in a pipe, the sensor interface comprising:
   a wakeup interface; and
   a data communication interface;
   operational logic that monitors the wakeup interface, and when a wakeup signal is received on the wakeup interface from the level sensor, the digital camera receives a command on the data communication interface from the level sensor that causes the digital camera to perform at least one function in response to the received command.

2. The digital camera of claim 1 wherein the received command from the level sensor is a command to take a photograph, and in response, the digital camera receives sensor data from the level sensor that specifies level of wastewater in the pipe, uses the image sensor to take a digital photograph, stores the digital photograph in the memory, overlays the sensor data as visible text on the digital photograph in the memory, and enters a sleep mode.

3. The digital camera of claim 2 wherein the digital camera takes a plurality of photographs in response to receiving the command to take a photograph from the level sensor.

4. The digital camera of claim 2 wherein the sensor data further comprises time and date and location corresponding to the specified level of wastewater in the pipe.

5. The digital camera of claim 1 wherein the received command from the level sensor is a command for the digital camera to turn on a wireless interface in the digital camera, and in response, the digital camera turns on the wireless interface in the digital camera.

6. The digital camera of claim 1 further comprising a time and date tag tool that writes metadata to the digital photograph indicating time and date the digital photograph was taken.

7. A system for monitoring wastewater in a pipe, the system comprising:
   (A) a level sensor that monitors level of wastewater in a pipe; and
   (B) a digital camera comprising:
   an image sensor for taking a digital photograph and storing the digital photograph in a memory;
   a sensor interface coupled to the level sensor that is external to the digital camera, the sensor interface comprising:
   a wakeup interface; and
   a data communication interface;
   operational logic that monitors the wakeup interface, and when a wakeup signal is received on the wakeup interface from the level sensor, the camera receives a command on the data communication interface from the level sensor that causes the camera to perform at least one function in response to the received command.

8. The system of claim 7 wherein the received command from the level sensor is a command to take a photograph, and in response, the digital camera receives sensor data from the level sensor that specifies level of wastewater in the pipe, uses the image sensor to take a digital photograph, stores the digital photograph in the memory, overlays the sensor data as visible text on the digital photograph in the memory, and enters a sleep mode.

9. The system of claim 8 wherein the digital camera takes a plurality of photographs in response to receiving the command to take a photograph from the level sensor.

10. The system of claim 8 wherein the sensor data further comprises time and date and location corresponding to the specified level of wastewater in the pipe.

11. The system of claim 7 wherein the command from the level sensor is a command for the digital camera to turn on a wireless interface in the digital camera, and in response, the digital camera turns on the wireless interface in the digital camera.

12. The system of claim 7 further comprising a time and date tag tool that writes metadata to the digital photograph indicating time and date the digital photograph was taken.

13. A digital camera comprising:
   a wireless interface that provides wireless communication with a device external to the digital camera;
   an image sensor for taking a digital photograph and storing the digital photograph in a memory;
   a sensor interface coupled to a level sensor external to the digital camera, wherein the level sensor monitors level of wastewater in a pipe, the sensor interface comprising:
   a wakeup interface; and
   a data communication interface;
   operational logic that monitors the wakeup interface, and when a wakeup signal is received on the wakeup interface from the level sensor, the operational logic receives a command on the data communication interface from the level sensor to turn on the wireless interface, and in response, the digital camera turns on the wireless interface.

* * * * *